United States Patent
Hagiwara et al.

(10) Patent No.: US 10,326,792 B2
(45) Date of Patent: *Jun. 18, 2019

(54) VIRUS INTRUSION ROUTE IDENTIFICATION DEVICE, VIRUS INTRUSION ROUTE IDENTIFICATION METHOD, AND PROGRAM

(71) Applicant: CANON DENSHI KABUSHIKI KAISHA, Chichibu-shi (JP)

(72) Inventors: Hiroshi Hagiwara, Tokyo (JP); Takashi Yotsuyanagi, Kawasaki (JP)

(73) Assignee: Canon Denshi Kabushiki Kaisha, Chichibu-shi (JP)

(*) Notice: Subject to any disclaimer, the term of this patent is extended or adjusted under 35 U.S.C. 154(b) by 32 days.

This patent is subject to a terminal disclaimer.

(21) Appl. No.: 14/723,898

(22) Filed: May 28, 2015

(65) Prior Publication Data

US 2015/0264062 A1    Sep. 17, 2015

Related U.S. Application Data

(63) Continuation of application No. PCT/JP2013/006842, filed on Nov. 21, 2013.

(30) Foreign Application Priority Data

Dec. 7, 2012 (JP) ................. 2012-268785

(51) Int. Cl.
*H04L 29/06* (2006.01)
*G06F 21/56* (2013.01)
*G06F 21/55* (2013.01)

(52) U.S. Cl.
CPC ............ *H04L 63/145* (2013.01); *G06F 21/55* (2013.01); *G06F 21/552* (2013.01); *G06F 21/56* (2013.01);
(Continued)

(58) Field of Classification Search
CPC ............ H04L 63/145; H04L 63/1425; H04L 2463/146; G06F 21/55; G06F 21/552; G06F 3/12; G06F 21/567; G06F 21/56
(Continued)

(56) References Cited

U.S. PATENT DOCUMENTS 5,822,533 A * 10/1998 Saito ................ G06F 11/3495
                                                              709/224
7,257,841 B2   8/2007 Naitoh
(Continued)

FOREIGN PATENT DOCUMENTS

JP          06110718 A      4/1994
JP          09-044432 A     2/1997
(Continued)

*Primary Examiner* — Abu S Sholeman
(74) *Attorney, Agent, or Firm* — Venable LLP

(57) ABSTRACT

The invention aims to backtrack a virus infection route with more detail than in the conventional case. CPUs of client devices respectively monitor operations, and cause storage devices to store operation histories. The CPU determines, upon detecting a virus, the time and date at which the virus was first saved in the client device based on the operation history stored in the storage device, and determines a virus intrusion route based on the operation content that was executed at the determined time and date.

27 Claims, 25 Drawing Sheets

(52) U.S. Cl.
CPC ........ *G06F 21/567* (2013.01); *H04L 63/1425* (2013.01); *H04L 2463/146* (2013.01)

(58) Field of Classification Search
USPC .......................................................... 726/4
See application file for complete search history.

(56) References Cited

U.S. PATENT DOCUMENTS

| | | | |
|---|---|---|---|
| 7,797,335 B2 | 9/2010 | Stern et al. | |
| 8,190,647 B1* | 5/2012 | Pereira ................. | G06F 21/566 707/749 |
| 8,413,244 B1* | 4/2013 | Nachenberg ......... | H04L 63/145 713/188 |
| 9,124,616 B2 | 9/2015 | Naito et al. | |
| 9,332,028 B2* | 5/2016 | Xaypanya ............. | H04L 63/145 |
| 2002/0138760 A1 | 9/2002 | Naitoh | |
| 2004/0133557 A1* | 7/2004 | Wen ...................... | G06F 16/338 |
| 2004/0172416 A1* | 9/2004 | Murakami ........... | G11B 27/329 |
| 2007/0006310 A1 | 1/2007 | Piccard | |
| 2007/0174911 A1* | 7/2007 | Kronenberg ............ | G06F 21/56 726/22 |
| 2007/0250817 A1* | 10/2007 | Boney ................... | G06F 21/56 717/124 |
| 2007/0250818 A1* | 10/2007 | Boney .................. | G06F 21/566 717/124 |
| 2007/0250928 A1* | 10/2007 | Boney ................... | G06F 21/56 726/24 |
| 2009/0320134 A1 | 12/2009 | Corcoran et al. | |
| 2009/0320136 A1* | 12/2009 | Lambert ............... | G06F 21/554 726/25 |
| 2010/0212013 A1* | 8/2010 | Kim ........................ | H04L 45/00 726/23 |
| 2011/0029819 A1* | 2/2011 | Mehta ................. | G06F 11/3644 714/38.12 |
| 2011/0032567 A1* | 2/2011 | Ishida .................... | G06F 21/56 358/1.15 |
| 2011/0320508 A1 | 12/2011 | Naito et al. | |
| 2012/0254995 A1* | 10/2012 | Sallam .................. | G06F 21/554 726/22 |
| 2012/0266247 A1* | 10/2012 | Guy ....................... | G06F 21/577 726/25 |
| 2013/0312099 A1* | 11/2013 | Edwards ............... | G06F 21/554 726/24 |
| 2014/0115652 A1* | 4/2014 | Kapoor ................. | G06F 21/554 726/1 |
| 2014/0189776 A1 | 7/2014 | Diehl | |
| 2014/0351936 A1* | 11/2014 | Hao ...................... | G06F 21/561 726/24 |
| 2015/0113647 A1* | 4/2015 | Sakamaki ........... | H04L 67/1002 726/23 |
| 2015/0193618 A1 | 7/2015 | Takano et al. | |
| 2015/0220814 A1* | 8/2015 | Verkasalo ............ | G06Q 20/322 382/103 |
| 2015/0264062 A1* | 9/2015 | Hagiwara ............... | G06F 21/56 726/24 |
| 2017/0019415 A1 | 1/2017 | Takano | |
| 2017/0374086 A1* | 12/2017 | Jeong ................. | H04L 63/1416 |

FOREIGN PATENT DOCUMENTS

| | | |
|---|---|---|
| JP | 11-134190 A | 5/1999 |
| JP | 2002-287991 A | 10/2002 |
| JP | 2004-086241 A | 3/2004 |
| JP | 2005-025378 A | 1/2005 |
| JP | 2008052570 A | 3/2008 |
| JP | 2009-176132 A | 8/2009 |
| JP | 2012-198796 A | 10/2012 |
| WO | 2012001763 A1 | 1/2012 |
| WO | 2014087597 A1 | 6/2014 |

* cited by examiner

F I G. 2
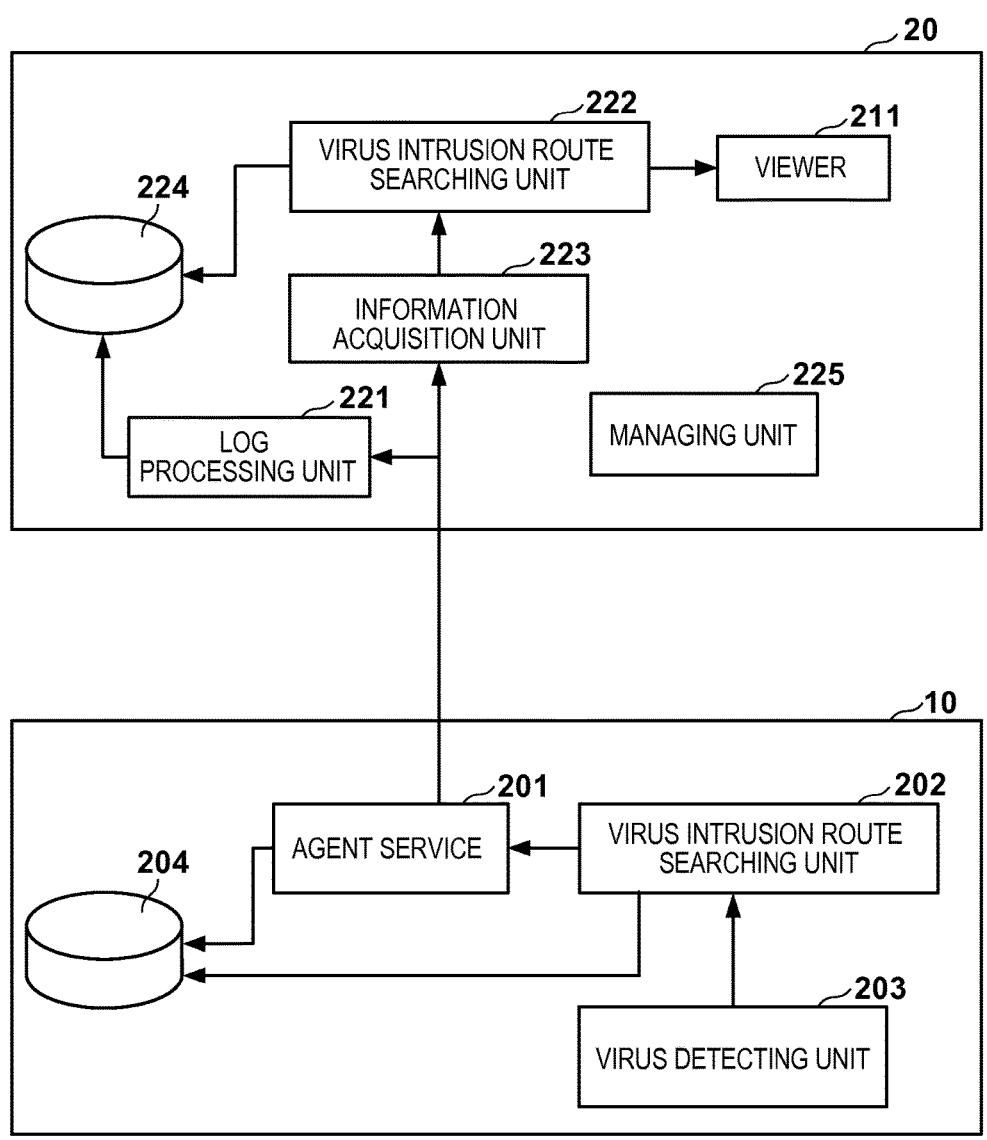

FIG. 6

| OPERATION NAME | FILE NAME (PATH NAME) | PROCESS NAME (PATH NAME) | ATTACHED FILE NAME | URL | TIME AND DATE |
|---|---|---|---|---|---|
| FILE DOWNLOAD | Malware.exe | webbrowser.exe | | HTTP://www.jp | 2012/11/20/130000 |
| SAVE | Malware.exe | | | | 2012/11/20/130530 |
| | | | | | |
| | | | | | |
| | | | | | |
| | | | | | |
| WEB ACCESS | | Malware.exe | | HTTP://www.gov | 2012/12/01/201430 |
| VIRUS DETECTION | | Malware.exe | | | 2012/12/01/201510 |

| OPERATION NAME 601 | FILE NAME (PATH NAME) 602 | PROCESS NAME (PATH NAME) 603 | COPY SOURCE 701 | URL 605 | TIME AND DATE 606 |
|---|---|---|---|---|---|
| FILE COPY | Malware.exe | filemanager.exe | REMOVABLE | | 2012/11/20/130000 |
| | | | | | |
| | | | | | |
| | | | | | |
| | | | | | |
| WEB ACCESS | | Malware.exe | | HTTP://www.gov | 2012/12/01/201430 |
| VIRUS DETECTION | | Malware.exe | | | 2012/12/01/201510 |

| OPERATION NAME | FILE NAME (PATH NAME) | PROCESS NAME (PATH NAME) | COPY SOURCE | URL | TIME AND DATE |
|---|---|---|---|---|---|
| FILE COPY | Malware.exe | filemanager.exe | \\server\Malware.exe | | 2012/11/20/130000 |
| | | | | | |
| | | | | | |
| | | | | | |
| | | | | | |
| WEB ACCESS | | Malware.exe | | HTTP://www.gov | 2012/12/01/201430 |
| VIRUS DETECTION | | Malware.exe | | | 2012/12/01/201510 |

601 — OPERATION NAME
602 — FILE NAME (PATH NAME)
603 — PROCESS NAME (PATH NAME)
701 — COPY SOURCE
605 — URL
606 — TIME AND DATE
600

FIG. 9

| 601 | 602 | 603 | 604 | 901 | 606 |
|---|---|---|---|---|---|
| OPERATION NAME | FILE NAME (PATH NAME) | PROCESS NAME (PATH NAME) | ATTACHED FILE NAME | MAIL ADDRESS | TIME AND DATE |
| MAIL RECEPTION | | Mailer.exe | ABCD.pdf | a@b.c.jp | 2012/11/11/081010 |
| | | | | | |
| | | | | | |
| FILE OPEN | ABCD.pdf | Reader.exe | | | 2012/11/20/125900 |
| NEW CREATION | Malware.exe | Reader.exe | | | 2012/11/20/130000 |
| | | | | | |
| | | | | | |
| WEB ACCESS | | Malware.exe | | HTTP://www.gov | 2012/12/01/201430 |
| VIRUS DETECTION | | Malware.exe | | | 2012/12/01/201510 |

600

F I G. 10
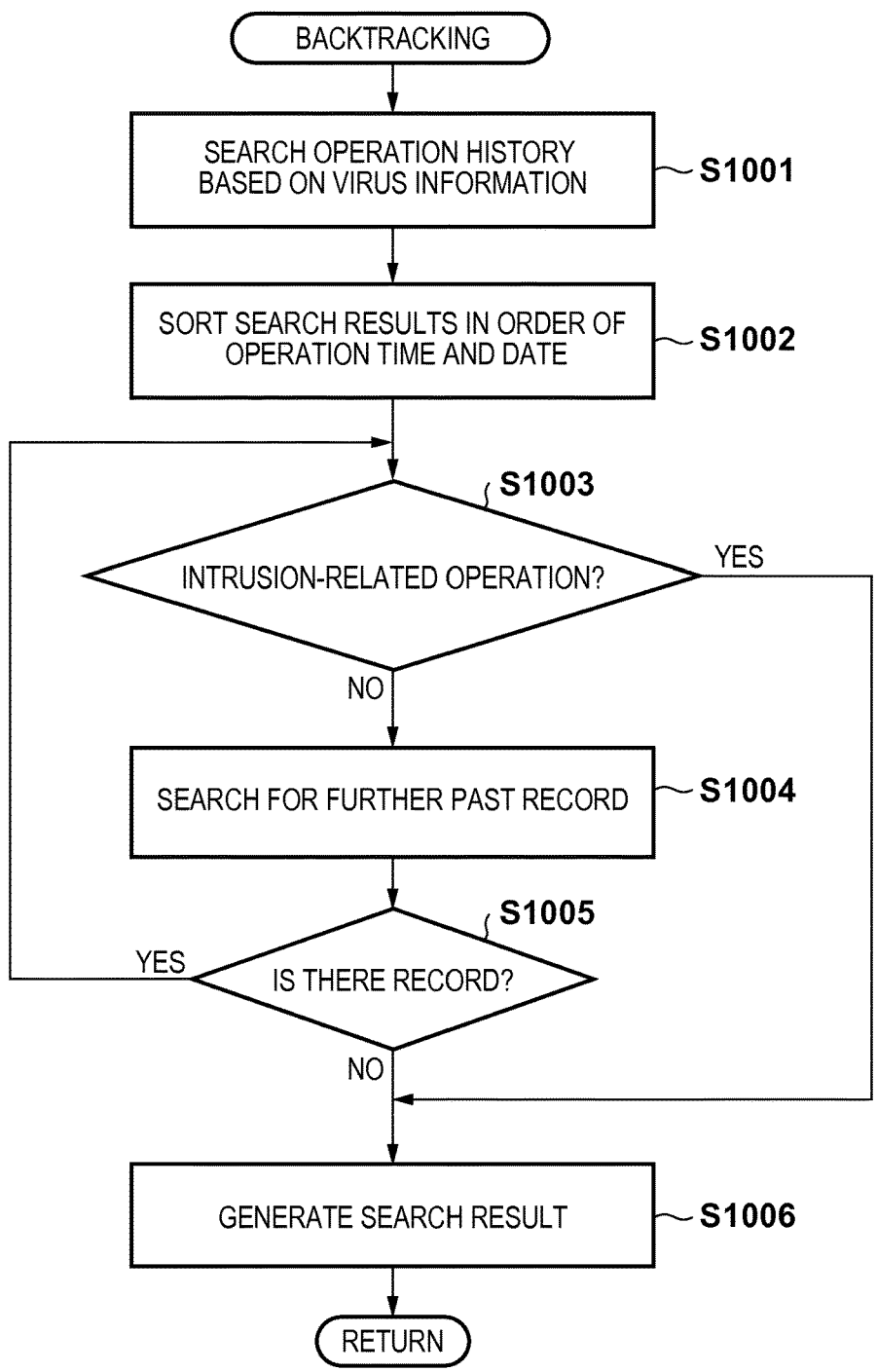

F I G. 11
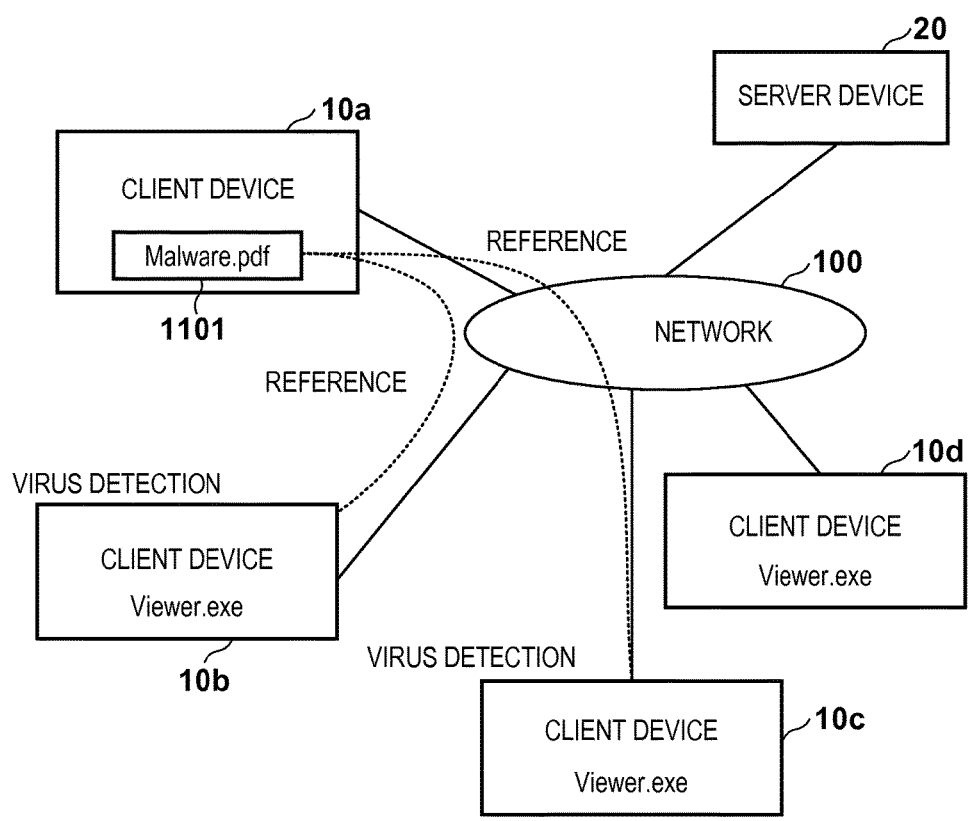

F I G. 14

| 1200 | 601 | 1201 | 603 | 602 | 606 |
|---|---|---|---|---|---|
| PC NAME | OPERATION NAME | PROCESS ID | PROCESS NAME (PATH NAME) | FILE NAME (PATH NAME) | TIME AND DATE |
| ClientB | START | 100 | \\ClientA\\Malware.exe | | 2012/12/05 075005 |
| ClientB | OPEN | 200 | c:\Viewer.exe | c:\test.txt | 2012/12/05 075100 |
| ClientB | VIRUS DETECTION | 100 | \\ClientA\\Malware.exe | | 2012/12/05 075126 |

600

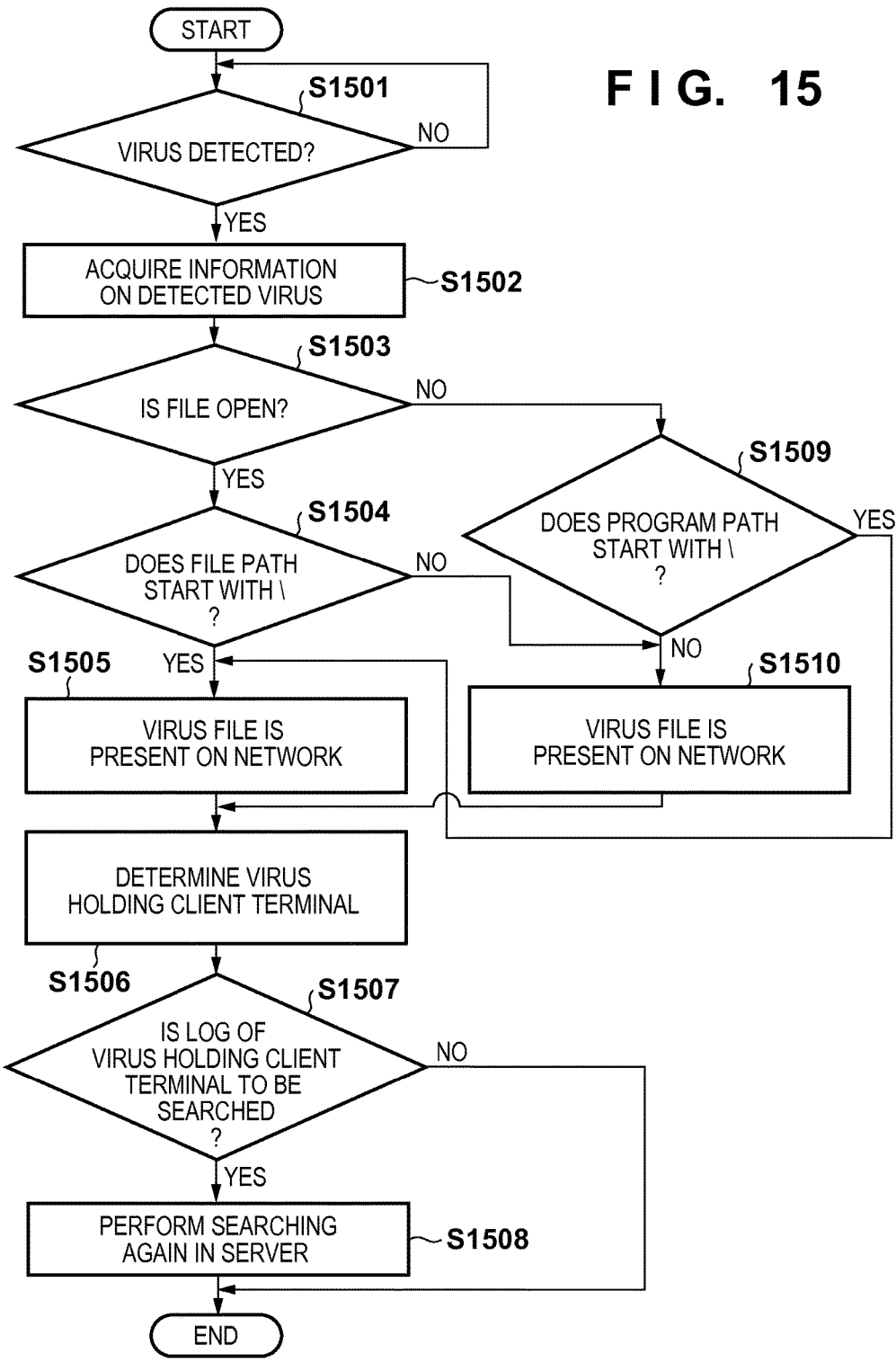
F I G. 15

F I G. 16
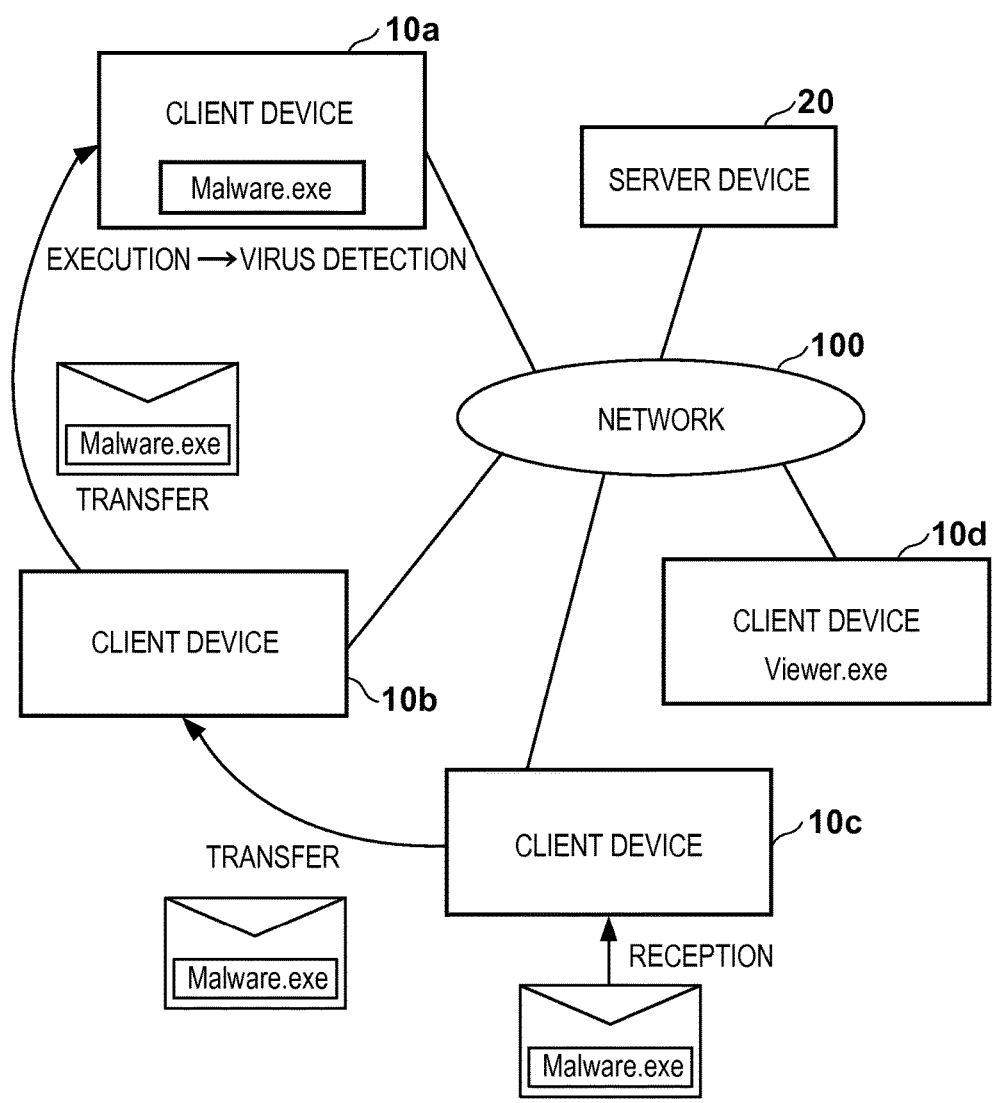

| 1200 | 601 | 1201 | 603 | 602 | 604 | 1701 | 1702 | 606 |
|---|---|---|---|---|---|---|---|---|
| PC NAME | OPERATION NAME | PROCESS ID | PROCESS NAME (PASS NAME) | FILE NAME (PASS NAME) | ATTACHED FILE NAME | MAIL ADDRESS FROM | MAIL ADDRESS TO | TIME AND DATE |
| ClientC | MAIL RECEPTION | 100 | C:\mailmailer.exe | | Malware.exe | unknown@malware.jp | ClientC@test.jp | 2012/12/05 075005 |
| ClientB | MAIL RECEPTION | 100 | C:\mailmailer.exe | | Malware.exe | ClientC@test.jp | ClientB@test.jp | 2012/12/05 095000 |
| ClientA | MAIL RECEPTION | 200 | C:\mailmailer.exe | | Malware.exe | ClientB@test.jp | ClientA@test.jp | 2012/12/05 095505 |
| ClientA | NEW CREATION | 200 | C:\mailmailer.exe | C:\inbox\Malware.exe | | | | |
| ClientA | START | 300 | C:\inbox\Malware.exe | | | | | 2012/12/05 122010 |
| ClientA | VIRUS DETECTION | 300 | C:\inbox\Malware.exe | | | | | 2012/12/05 155126 |
| | | | | | | | | 2012/12/05 155130 |

FIG. 25

| PC NAME 1200 | OPERATION NAME 601 | PROCESS ID 1201 | PROCESS NAME (PASS NAME) 603 | FILE NAME (PASS NAME) 602 | ATTACHED FILE NAME 604 | MAIL ADDRESS FROM 1701 | MAIL ADDRESS TO 1702 | TIME AND DATE 606 | SUBJECT 607 | MESSAGE ID 608 |
|---|---|---|---|---|---|---|---|---|---|---|
| ClientC | MAIL RECEPTION | 100 | C:\mailmailer.exe | | Malware.exe | unknown@malware.jp | ClientC@test.jp | 2012/12/05 075005 | Test3 | 20121205074402.5689.A22414DA@malware.jp |
| ClientB | MAIL RECEPTION | 100 | C:\mailmailer.exe | | Malware.exe | ClientC@test.jp | ClientB@test.jp | 2012/12/05 095000 | Test2 | 20121205094405.C189.A96414DA@test.jp |
| ClientA | MAIL RECEPTION | 200 | C:\mailmailer.exe | | Malware.exe | ClientB@test.jp | ClientA@test.jp | 2012/12/05 095505 | Test | 20121205095405.35BE.A96419DA@test.jp |
| ClientA | MAIL OPEN | 200 | C:\mailmailer.exe | | Malware.exe | ClientB@test.jp | ClientA@test.jp | 2012/12/05 122000 | Test | 20121205095405.35BE.A96419DA@test.jp |
| ClientA | NEW CREATION | 200 | C:\mailmailer.exe | C:\inbox\Malware.exe | | | | 2012/12/05 122010 | | |
| ClientA | START | 300 | C:\inbox\Malware.exe | | | | | 2012/12/05 155126 | | |
| ClientA | VIRUS DETECTION | 300 | C:\inbox\Malware.exe | | | | | 2012/12/05 155130 | | |

600

VIRUS INTRUSION ROUTE IDENTIFICATION DEVICE, VIRUS INTRUSION ROUTE IDENTIFICATION METHOD, AND PROGRAM

This application is a continuation of International Patent Application No. PCT/JP2013/006842 filed on Nov. 21, 2013, and claims priority to Japanese Patent Application No. 2012-268785 filed Dec. 7, 2012, the entire content of both of which is incorporated herein by reference.

BACKGROUND OF THE INVENTION

Field of the Invention

The present invention relates to a technique for determining a computer virus infection route.

Description of the Related Art

Computer viruses have become more and more sophisticated. In order to prevent infection by a computer virus, it is important to determine a computer virus infection route. Assume here that an operation for tracing, when a virus is found, the place that the virus comes from is referred to as backtrack, back-trace or trace-back, and an operation for estimating terminals to which this virus has already spread is referred to as forward track.

Patent reference 1 discloses an invention relating to backtrack. According to Patent reference 1, a central device estimates, upon detection of a virus from a file transmitted from a terminal device via the central device, a virus infection period based on the time and date on which a vaccine was registered, the time and date on which this file was last transmitted, and the time and date on which this file is transmitted this time. Particularly, if the time and date on which this file was last transmitted is after the time and date on which the vaccine was registered, it will be determined that the infection route is via a device other than the central device, and if the time and date on which this file was last transmitted is before the time and date on which the vaccine was registered, it will be determined that the infection route is via the central device or another ISP.

Patent reference 2 discloses an invention relating to forward track. According to Patent reference 2, a damage range estimation system is disclosed that determines, when a virus has been detected from a file of one client terminal, other client terminals that has ever accessed this file in the past, as a terminal that may be infected by the virus.

PRIOR ART DOCUMENTS

Patent reference 1: Japanese Patent Laid-Open 2002-287991
Patent reference 2: Japanese Patent Laid-Open 2009-176132

SUMMARY OF THE INVENTION

Problems that the Invention is to Solve

According to Patent reference 1, it is only possible to perform determination of two infection routes, that is, to determine whether virus infection is via the central device or another device. However, the reality is that there are a variety of infection routes. For example, virus infection may occur from a file attached to an e-mail, from a removable medium such as a USB memory, or from a file or script downloaded at the time of website browsing. Accordingly, it is not possible to determine a specific infection route only based on the time and date at which a file was transmitted. Furthermore, in Patent reference 1, a virus is basically detected by the central device, and thus it is not possible to perform, with respect to a file that is not transmitted via the central device, either virus detection or determination of a virus infection route. That is, an infection route cannot be specified only based on a terminal device. Furthermore, since Patent reference 1 focuses only on the time and date at which a file was transmitted, it is not possible to specify an infection route with respect to a file that is not transmitted. Accordingly, based on a file transmission history, it is only possible to specify an infection route to the extent whether the infection occurred via the central device or via another route.

Furthermore, a file is copied, overwritten, or renamed after having newly been created. Furthermore, there is a case where a virus is detected from a temporary file that is created by expanding a file attached to an e-mail, and also in this case, it is difficult to specify an infection route since the temporary file may be named with a random file name. Furthermore, special viewer software for use in browsing a particular file may be called from a web browser by OLE (Object Linking and Embedding). In this case, it is not possible to reliably determine a virus infection route by monitoring only the time and date at which the viewer software was executed. This is because it is not possible to determine whether or not this file was acquired by the web browser.

According to Patent reference 2, when a virus is found in one client terminal, other client terminals that may also be infected by the same virus can be determined (referred to as forward track). However, in Patent reference 2, it is not possible to perform backtracking for determining where this virus comes from in the first place, with respect to the client terminal in which the virus was first found.

The present invention enables backtracking of a virus infection route with more detail than in the conventional cases using, for example, an operation history.

Means of Solving the Problems

The present invention provides, for example a virus intrusion route determining device that backtracks a virus intrusion route to a terminal device, including: an operation history storage unit configured to store an operation history which is a history of operations executed in the terminal device; a specifying unit configured to determine, upon detecting a virus in the terminal device, a virus intrusion route of the virus based on the operation history stored in the operation history storage unit; and an output unit configured to output information indicating the virus intrusion route determined by the determining unit, wherein the information indicating the virus intrusion route includes information indicating a route in which the virus moved.

Effects of the Invention

According to the present invention, it is possible to backtrack a virus infection route with more detail than in the conventional cases using an operation history.

Further features and advantages of the present invention will become apparent from the following description with reference to the attached drawings. Note that in the attached drawings, the same reference numerals are given to the same or similar configuration.

BRIEF DESCRIPTION OF THE DRAWINGS

The attached drawings are included in the specification and constitute part thereof, showing embodiments of the present invention, and being used for illustrating the spirit of the present invention together with the description of the embodiments.

FIG. 2 is a block diagram showing functions that are realized by a CPU or the like executing various types of programs.

FIG. 6 is a diagram showing an example of backtracking in a case of virus infection by web browsing.

FIG. 7 is a diagram showing an example of backtracking in a case of virus infection by a removable device.

FIG. 8 is a diagram showing an example of backtracking in a case of virus infection by a file sharing protocol.

FIG. 9 is a diagram showing an example of backtracking in a case of virus infection by a mailer.

FIG. 10 is a flowchart showing an example of the virus intrusion route search processing (backtracking).

FIG. 11 is a diagram showing an example of a virus infection route.

FIG. 14 is a diagram showing an example of backtracking based on an operation history.

FIG. 15 is a flowchart showing an example of backtracking.

FIG. 16 is a diagram showing an example of the virus infection route.

FIG. 17 is a diagram showing an example of backtracking based on an operation history.

FIG. 25 is a diagram showing an example of backtracking based on an operation history.

DESCRIPTION OF THE EMBODIMENTS

Basic Ideas

Figure 1:
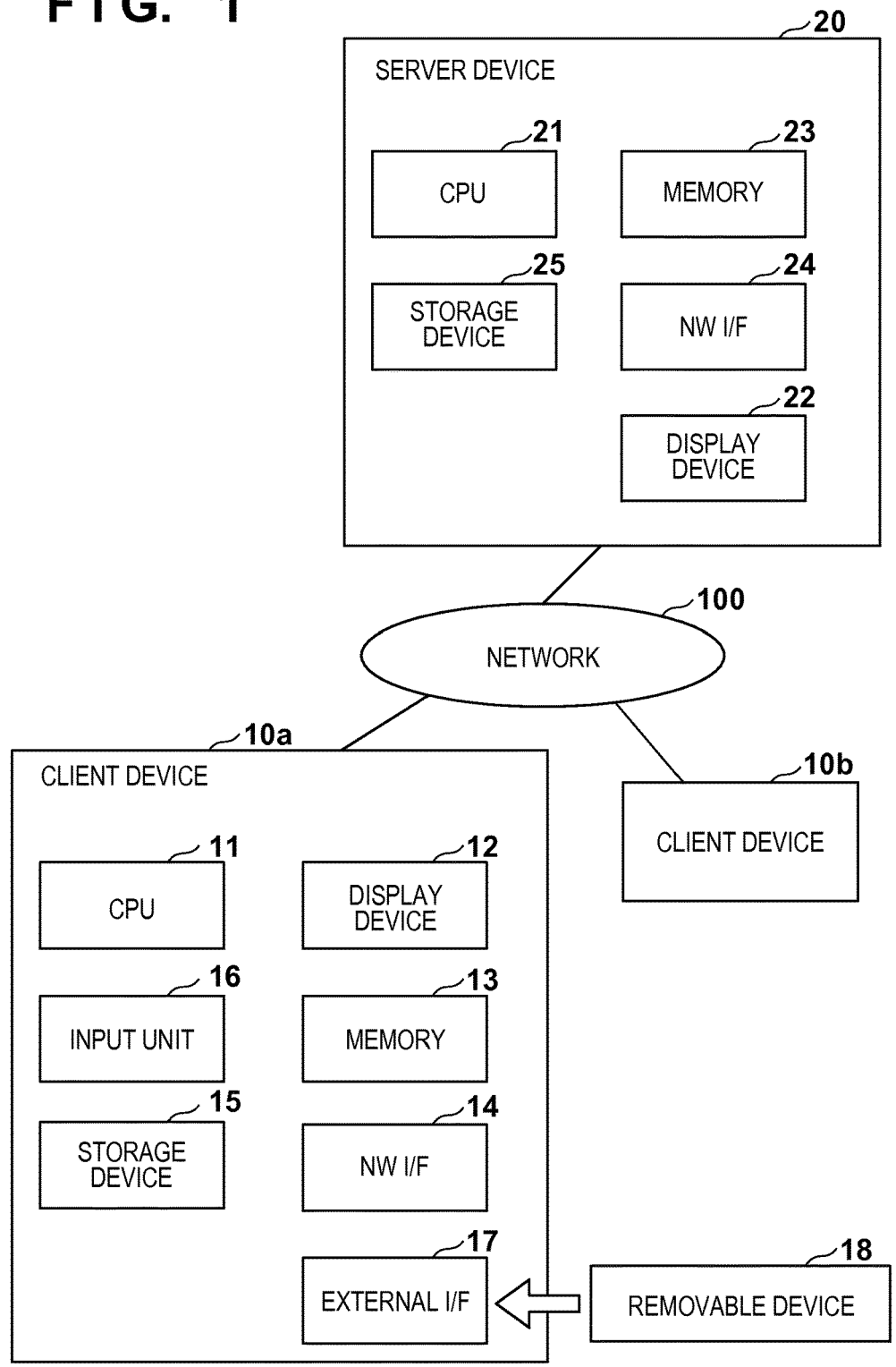
FIG. 1 is a diagram showing an example of a virus intrusion route search system.

Ordinarily, the following routes are conceivable as computer virus intrusion routes.

(I) Infection from a file attached to an e-mail (determination of an e-mail sender)

(II) Infection from a removable medium (in a case of a USB memory, determination of its vender ID or serial ID)

(III) Infection from a website (determination of a website URL)

(IV) Infection from a file sharing network (determination of a path name or the like in a network)

Note that the following factors are conceivable, for example, as factors of the infections.

They are, for example,
(a) Removable medium,
(b) File execution,
(c) File copy/migration,
(d) Website browsing,
(e) Script execution,
(f) OLE (Object Linking and Embedding),
(g) Vulnerability attack,
(h) E-mail MUA,
(i) URL click,
(j) Web mail,
(k) Virus infection,
(l) File downloading,
(m) Saving of a file,
(n) Saving of a file with a different name,
(o) Flash execution,
(p) Decompression processing on compressed archive files (ZIP, etc.)

Furthermore, intrusion routes based on combinations of these infection factors can be divided as follows.

(1) A file stored in a removable medium is executed (a=>b)
(2) A file stored in a removable medium is copied (a=>c)
(3) A ZIP file stored in a removable medium is decompressed (a=>p)
(4) A file is locally copied and executed (c=>b)
(5) A file created by locally decompressed a ZIP file is executed (p=>b)
(6) A file created by locally decompressed a ZIP file is copied (p=>c)
(7) Browsing of a website by executing a file (b=>d)
(8) Browsing of a website and executing a script (d=>e)
(9) Executing a file and calling an OLE (b=>f)
(10) Executing a file by OLE (f=>b)
(11) Vulnerability attack due to execution of a script (e=>g)
(12) Vulnerability attack due to execution of a file (b=>h)
(13) File download by web browsing (d=>l)
(14) Click of an attached URL by execution of an e-mail MUA (n=>i)
(15) Downloading of a file by a web mail (j=>l)
(16) Click of an attached URL by a web mail (j=>i)
(17) Downloading of a file by an e-mail MUA (h=>l)
(18) Virus infection due to vulnerability attack (g=>k)
(19) Browsing of a website by clicking an attached URL (i=>d)
(20) Saving and executing a file (m=>b)
(21) Saving a file with a name and executing it (n=>b)
(22) Downloading and executing a file (l=>b)
(23) Downloading and saving a file (l=>m)
(24) Downloading a file and saving the file with a name (l=>n)
(25) Executing a flash by web browsing (d=>o)
(26) Vulnerability attack due to execution of a flash (o=>g)
(27) E-mail transfer (h=>h)

The actual intrusion route is further a complex combination of them. An example of the route is a route in which a website is browsed, a file (ZIP) is downloaded, the downloaded file (ZIP) is saved, the saved file (ZIP) is decompressed, the decompressed file is executed, vulnerability attack, and virus infection (d=>l=>m=>p=>b=>g=>k). Furthermore, an example of the completed route starting from an e-mail is a route in which an email MUA is executed, an attached file is downloaded, the attached file is saved, saved file is executed, vulnerability attack, and virus infection (h=>1=>m=>b=>g=>k). An example of the intrusion route from a removable medium such as a USB memory is a route in which a removable medium, a file is copied, the file is executed, vulnerability attack, and virus infection (a=>c=>b=>g=>k). In the case of infection from a file sharing network, the route is a route in which a file is copied, the file is executed, vulnerability attack, and virus infection (c=>b=>g=>k). The virus detection software searches for a virus-specific code so as to find a file infected by a virus, and specifies the process name (process path name) and the process ID of the process that has tried to execute this file. Therefore, by searching an operation history using the process path name and the process ID as search keys, it is possible to determine which route an infected file was created in a terminal, that is, it is possible to determine an intrusion route.

As an operation history, operation contents executed by a user on the terminal device, operation times and dates, and the like are recorded. As the operation content with respect to web browsing, a website URL, a path name of a downloaded file, a path name of an uploaded file, and the like are recorded. As the operation content with respect to a file operation, a path name of a file that was a target of the operation (the path name of a copy source and the path name of a copy destination), the type of the operation (opening the file, changing the name, deletion, new creation, overwrite saving, saving with a new name), and the like are recorded. As the operation content with respect to a removable medium, connection and removal of the removable device, the device name, the device ID, the vender ID, the serial ID, and the like are recorded. As the operation content with respect to an e-mail MUA, distinction of transmission or reception, presence or absence of an attached file, destination, the e-mail address of a sender, the subject, the Message ID, and the like are recorded. As the operation content with respect to FTP, file uploading, file downloading, file deletion, and the like are recorded. As the operation content with respect to an active window, URL access, active window, changing of a window title, dialog of saving with a new name, and the like are recorded.

In order to search for an intrusion route from an operation history, examples of search keys that are mainly used include the path name, the process name, and the process ID. Assume, for example, that a virus is found when a file is attempted to be executed. In this case, the path name of the file, the process name and process ID of the process that tried to execute this file, and the like are determined by the virus detection software. An intrusion route searching unit for searching for a virus intrusion route searches an operation history using these items as search keys, and finds the records that match the search keys. The intrusion route searching unit specifies the name of the process that first saved the file in which a virus was detected and the path name of this file, when the records are arranged in order of the time and date at which the records were generated. For example, if the process that is involved in saving of this file in the terminal device initially is an e-mail MUA, it will be apparent that the file, infected by the virus, came via an e-mail. Furthermore, if this process is web browsing, it will be apparent that the file, infected by the virus, came via the web. If this process is file managing and the path name of the copy source is a removable device, it will be apparent that the file, infected by the virus, came via the removable device. Furthermore, if the path name has \\, it will be apparent that the file, infected by the virus, came from a file server shared according to a file sharing protocol. Note here that "save" is an idea that includes new creation and overwrite saving of a file.

Note that if OLE is involved, it will become possible to specify a virus intrusion route more in detail by specifying a parent process that called a process using the OLE from an operation history.

Meanwhile, it is also conceivable that part or all of an operation history were transferred to a server on a network and insufficient operation history remains in the terminal device. In this case, there is the risk that a virus intrusion route cannot reliably be determined locally. Therefore, in this case, the terminal device requests the server to backtrack an intrusion route. The server device also includes the same intrusion route searching unit as that of the terminal device, and holds operation histories of a plurality of terminal devices in a database. By the terminal device cooperating with the server device in this manner, the virus intrusion route may be determined by tracing further past operation histories. Furthermore, by applying the fact that operation histories of a plurality of terminal devices are saved in the server device, an intrusion route over the plurality of terminal devices can be determined.

FIG. 1 is a diagram showing an example of a virus intrusion route search system that includes client devices 10*a* and 10*b* (hereinafter, referred to simply as "client device 10") and a server device 20 that collects operation histories. The server device 20 is not essential for the present invention, but is essential in some embodiments and thus shown in FIG. 1. The client device 10 is an example of a computer that is installed in, for example, a company, school, administrative agency, home, and the like, and acquires an activity history (operation history or browsing history) of a user. Note that the client device 10 is not limited to a personal computer, and may be a scanner device, a multifunction peripheral, a digital camera, or a mobile terminal device. The server device 20 is a computer that acquires operation histories from the plurality of client devices 10 to compile a database or searches for a virus intrusion route. Note that the server device 20 is an option and is not necessarily essential. The client device 10 is connected to the server device 20, a Web server, an FTP server, an e-mail server, and the like via a network 100 such as the Internet or an Intranet.

The client device 10 is an information processing device (terminal device) such as a personal computer that is installed in an office (company, school, or administrative agency), home, or the like. In the client device 10, a CPU 11 functions as various types of units in accordance with software stored in a storage device 15. The storage device 15 is a hard disk drive (HDD), an SSD, or the like. A memory 13 includes a RAM, a ROM, and the like. In the ROM, a boot program such as BIOS is stored. An operating system (OS) is activated in accordance with the boot program, and furthermore various types of resident programs (such as an agent service, a virus detection program, or a virus intrusion route search program) are started in accordance with the OS. The RAM functions as a work area. A network interface 14 is a communication circuit for communicating with another computer via a network 100. The CPU 11 and the network interface 14 function as a receiving unit configured to receive information from the server device or a transmitting unit configured to transmit information to the server device. The storage device 15 stores not only a web browser and an e-mail MUA, but also an OS, an agent service, a virus detection program, a virus intrusion route search program, an operation history database, and the like. The agent service is a program in charge of monitoring and recording an operation history. As an OS, Windows (registered trademark) will be described as an example, but the OS may also be MacOS, Linux (registered trademark), iOS, Android, or the like. An input unit 16 is a pointing device (such as a mouse or a touch panel), a keyboard, and the like. The keyboard may be a software keyboard. Furthermore, the input unit 16 may also be a sound-recognizing input unit that recognizes an input sound of an operator using a sound recognition function and inputs an instruction into the CPU 11. A display device 12 is a user interface for displaying information. An external interface 17 is a USB interface or the like, and a removable device 18 is connected thereto. The removable device 18 is, for example, a USB memory or the like that is recognized as a storage class.

A storage device 25 of the server device 20 is a hard disk drive (HDD), an SSD, or the like, and stores a server program. The memory 23 includes a RAM, a ROM, and the like. The CPU 21 loads the server program onto the RAM, and acquires operation history data from the plurality of client devices 10 so as to compile a database or to search for a virus intrusion route. A network interface 24 is a communication circuit for communicating with another computer via the network 100. A display device 12 is a user interface for displaying information.

FIG. 2 is a block diagram showing functions realized by the CPU or the like executing various types of programs. The agent service 201 of the client device 10 sets, for a virus intrusion route searching unit 202, setting information that is set by a managing unit 225 of the server device 20, monitors the operation of a user to record an operation history in a database 204, acquires a result of search by the virus intrusion route searching unit 202, and transmits to the server device 20 a request for asking the server device 20 to search for a virus intrusion route. Upon acquisition of virus information (the path name of an infected file, the virus name, the path name of a virus-related process, or the like) from a virus detecting unit 203, the virus intrusion route searching unit 202 backtracks the virus intrusion route based on the operation history. The virus detecting unit 203 detects a known virus or unknown virus based on a virus definition file or other factors. In the operation history database 204, various types of contents, times and dates, and the like of operations executed by a user in the client device 10 are recorded as an operation history. The agent service 201 may transfer part or all of the operation history to the server device 20, at a predetermined timing, and may delete the transferred operation history. Furthermore, part or all of the agent service 201, the virus intrusion route searching unit 202, the virus detecting unit 203, and the database 204 of the client device 10 may be realized by a thin client (for example, a terminal service). The terminal service is a service that enables a client computer to remotely connect to a server computer and execute an application program on the server computer using a virtual desktop environment created on the server computer. At that time, a plurality of users can log in to services provided by the server computer using the respective user accounts simultaneously, and can use the virtual desktop environment.

The server device 20 includes a virus intrusion route searching unit 222 that has a similar function to that of the virus intrusion route searching unit 202 of the client device 10. Upon receiving a request for searching for a virus intrusion route via an information acquisition unit 223, the virus intrusion route searching unit 222 searches the operation history of this client device as a search target, and determines a virus intrusion route. This search result is displayed on the display device 22 by a viewer 211, or transmitted to the client device 10. A log processing unit 221 writes the operation history transferred by the agent service 201 into the operation history database 224. In the operation history database 224 of the server device 20, data of the operation history that covers a longer period than the operation history database 204 of the client device 10 is stored. The information acquisition unit 223 is in charge of, for example, transmitting and receiving data to and from the client device 10. Upon receiving a search request from the agent service 201, the information acquisition unit 223 gives the request to the virus intrusion route searching unit 222. Furthermore, upon receiving an operation history from the agent service 201, the information acquisition unit 223 gives the operation history to the log processing unit 221. For example, the communication processing is executed by HTTP communication. Upon receiving a backtrack result from the virus intrusion route searching unit 222, the information acquisition unit 223 transmits the result to the client device 10 that has transmitted the request. The log processing unit 221 writes the operation history received from the client device 10 into the operation history database 224. The viewer 211 displays the backtrack result received from the virus intrusion route searching unit 222 on the display device 22. The managing unit 225 configures various types of settings (setting of an operation history to be recorded, holding time period of the operation history, and the like) for the agent service 201.

Figure 3:
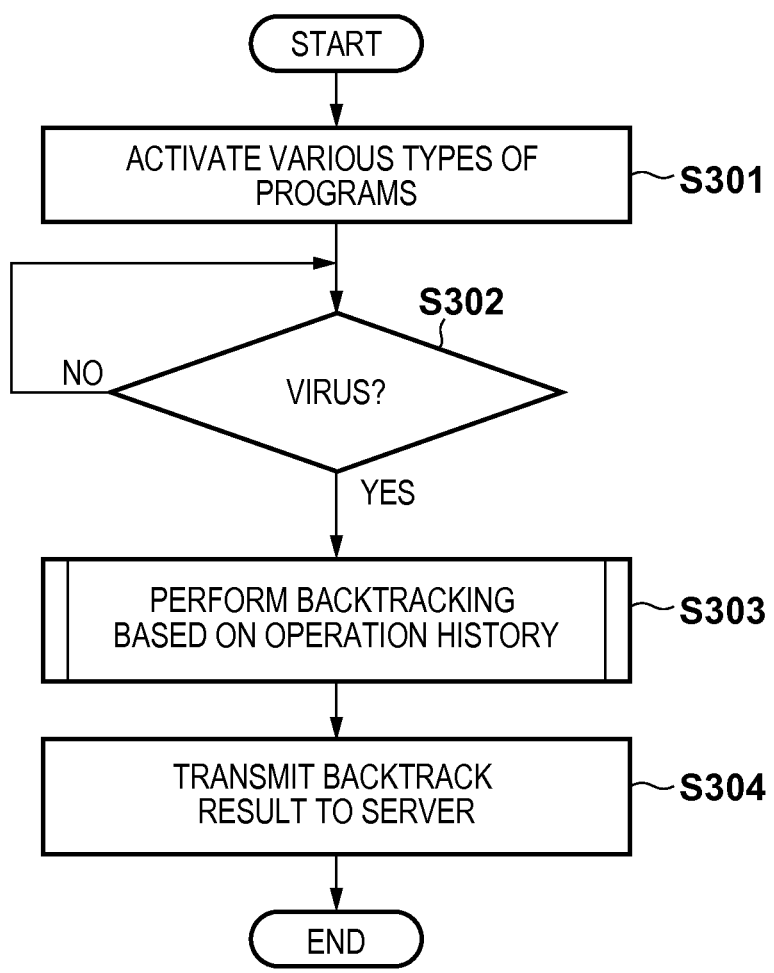
FIG. 3 is a flowchart showing virus intrusion route search processing.

FIG. 3 is a flowchart showing virus intrusion route search processing executed by the CPU 11 of the client device 10.

In step S301, the CPU 11 starts the agent service program, the virus detection program, the intrusion route search program, and the like in accordance with the OS. Accordingly, the agent service 201, the virus intrusion route searching unit 202, the virus detecting unit 203, and the like start their operations.

In step S302, the CPU 11 determines whether or not the virus detecting unit 203 has detected a virus. If the CPU 11 (virus intrusion route searching unit 202) is notified of detection of a virus by the virus detecting unit 203, the procedure advances to step S303. The virus detecting unit 203 notifies the CPU 11 (virus intrusion route searching unit 202) of information (referred to as virus detection information) such as the process path name, the detection time and date, or the process ID of the virus-related process. Note that the CPU 11 (virus intrusion route searching unit 202) may also recognize that a virus has been detected by searching virus detection logs generated by the virus detecting unit 203. In this case, it is advantageous that the present invention is applicable even to a virus detection program that is not intended to cooperate with the intrusion route search program.

In step S303, the CPU 11 (virus intrusion route searching unit 202) searches the operation history database 204 in accordance with a search key included in the virus detection information. Accordingly, the time and date at which a virus-related file or process was first generated in the client device 10 or an intrusion route can be determined. Such backtracking will be described in detail later.

In step S304, the CPU 11 (virus intrusion route searching unit 202) transmits a backtrack result to the server device 20 via the agent service 201. The server device 20 displays, upon receiving the backtrack result via the information acquisition unit 223, the backtrack result on the display device 22 using the viewer 211. Accordingly, a system administrator can easily recognize a virus intrusion route.

As described above, if no operation history is included in the client device 10 or only part of an operation history remains therein, backtracking may fail within the client device. Therefore, the present invention will describe the example in which the client device 10 requests the server device 20 to perform backtracking and thereby the client device 10 and the server device 20 execute backtracking in cooperation with each other.

Figure 4:
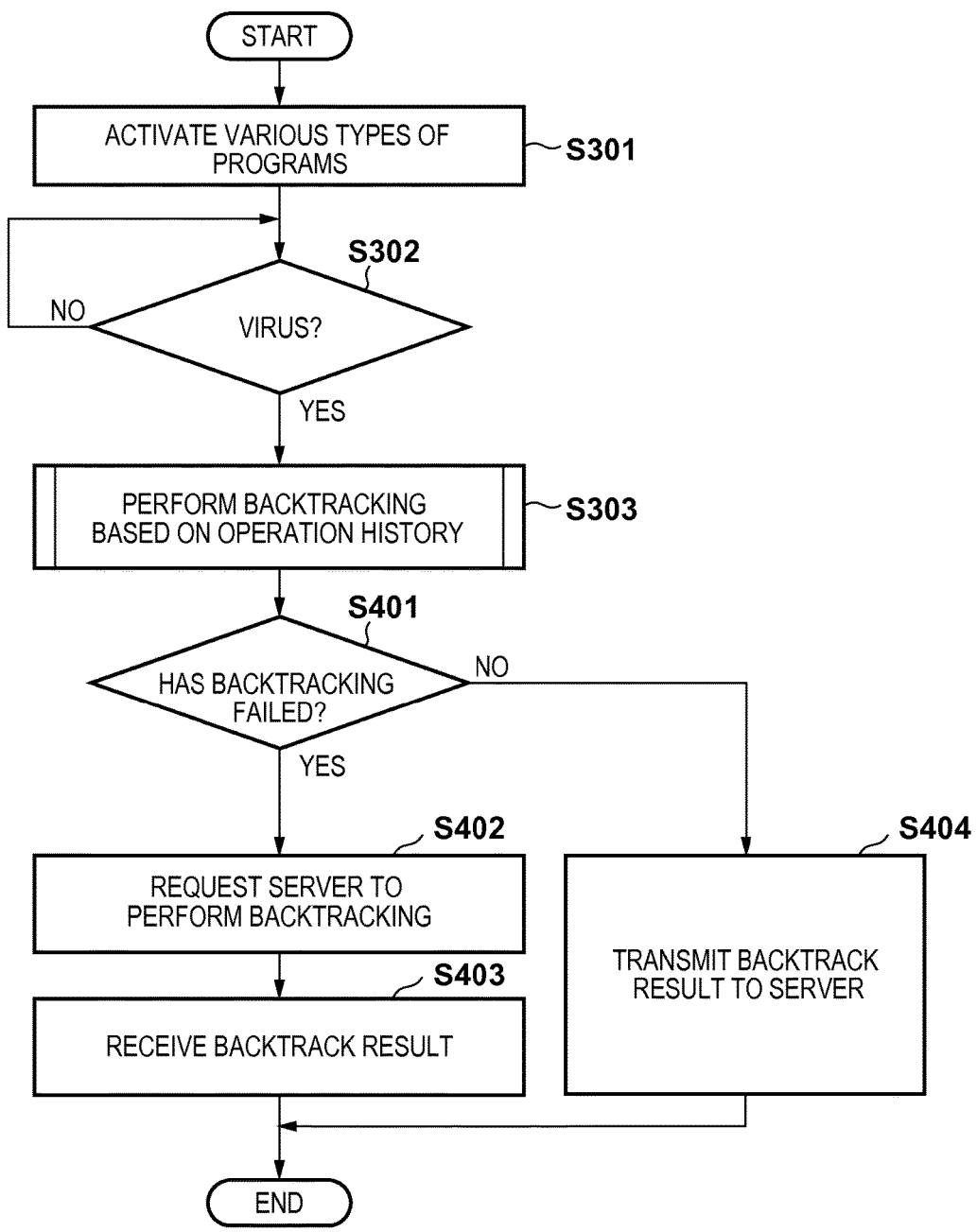
FIG. 4 is a flowchart showing another example of the virus intrusion route search processing.

FIG. 4 is a flowchart showing another example of the virus intrusion route search processing executed by the CPU 11 of the client device 10. By giving the same reference numerals to the processing that have already been explained, description thereof are omitted. Here, after execution of steps S301 to S303, the procedure advances to step S401.

In step S401, the CPU 11 (virus intrusion route searching unit 202) determines whether or not backtracking has failed. The CPU 11 determines that backtracking has failed, if, for example, no record of a path name of a virus-related process was found or the record was found but an intrusion route cannot be determined from this record. If backtracking has failed, the procedure advances to step S402.

In step S402, the CPU 11 (virus intrusion route searching unit 202) transmits a request for asking the server device 20 to perform backtracking to the server device 20 via the agent service 201. At that time, the CPU 11 also transmits virus detection information needed for executing the backtracking, identification information (a network address or a computer name) for specifying the client device 10, and the like to the server device 20.

In step S403, the CPU 11 (virus intrusion route searching unit 202) receives a backtrack execution result from the server device 20 via the agent service 201. The CPU 11 may display the backtrack execution result on the display device 12. Therefore, the user can recognize a virus intrusion route.

On the other hand, if it is determined in step S401 that backtracking ended successfully, the procedure advances to step S404. In step S404, the CPU (virus intrusion route searching unit 202) transmits the backtrack result to the server device 20 via the agent service 201. Upon receiving the backtrack result via the information acquisition unit 223, the server device 20 displays the backtrack result on the display device 22 using the viewer 211.

Figure 5:
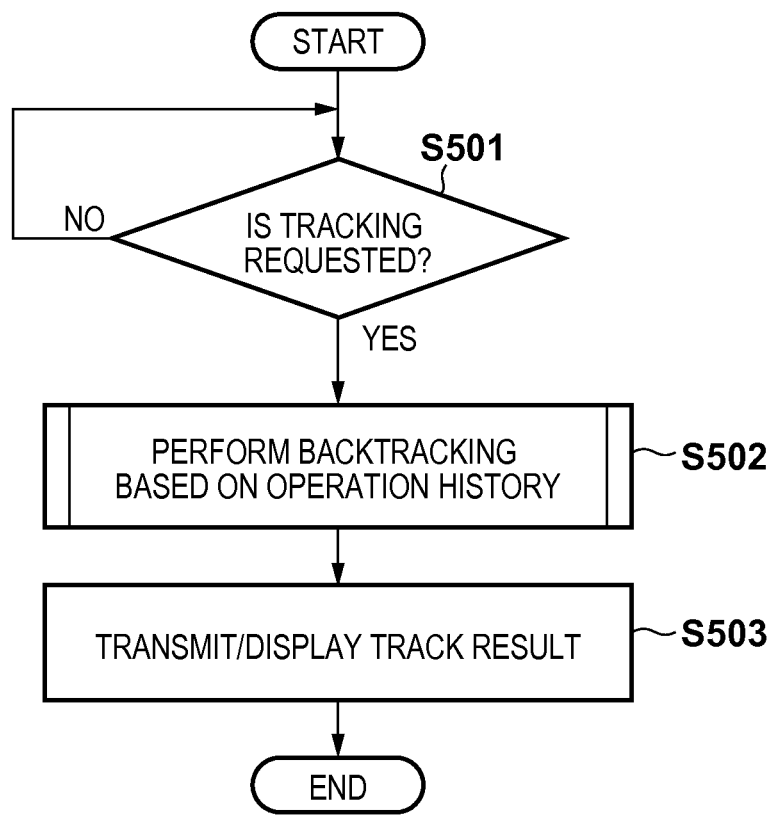
FIG. 5 is a flowchart showing an example of virus intrusion route search processing.

FIG. 5 is a flowchart showing an example of virus intrusion route search processing executed by the CPU 21 of the server device 20.

In step S501, the CPU 21 (virus intrusion route searching unit 222) determines whether or not a request for execution of backtracking has been received via the information acquisition unit 223. If the request has been received, the procedure advances to step S502.

In step S502, the CPU 21 (virus intrusion route searching unit 222) executes backtracking. For example, the CPU 21 accesses to the operation history database 224 and executes searching using the virus detection information received from the client device 10 and the identification information for specifying the client device 10 as search keys. Based on the found record, the time and date at which the virus-related file was first created in the client device 10, and the intrusion route (for example, a web browser, an e-mail MUA, a removable device, or a file sharing protocol) of the virus are determined.

In step S503, the CPU 21 (virus intrusion route searching unit 222) displays the backtrack result on the viewer 211 or transmits the backtrack result to the client device 10.

Detail of Backtracking

FIG. 6 shows an example of backtracking in a case of virus infection by web browsing. Here, the example in which backtracking is executed based on the operation content stored in an operation history 600. The operation history 600 includes, for example, an operation name 601, a file name 602, a process name 603, an attached file name 604, a URL 605, operation time and date 606, and the like. The URL 605 may be specified based on a network access log, or a window name (title name)/address bar name of an active window of a target process. Note that there is a case where, depending on a process, a program (child program) is generated based on a process (parent program). In this case, the URL 605 may be determined based on the window names (title names)/address bar names of the parent program/child program. If the virus detecting unit 203 has detected a virus, the process name (for example: Malware.exe), the process ID, and the like are given to the virus intrusion route searching unit 202 from the virus detecting unit 203. The virus intrusion route searching unit 202 searches the operation history 600 using the process name (for example: Malware.exe) and the process ID as search keys, and backtracks the route from the operation content of the latest time and date. In this example, it is clear that the virus (Malware.exe) executes a web access. Furthermore, the virus intrusion route searching unit 202 backtracks the operation history further in the past. In this example, it is clear that the virus (Malware.exe) was stored at 13:05:30 on Nov. 20, 2012. Note that the process name 603 and the file name 602 may be path names that include paths. The reason is that backtracking can be executed more exactly. Furthermore, the virus intrusion route searching unit 202 backtracks the operation history further in the past, and finds that the virus (Malware.exe) was downloaded from a site (http://www.jp) by webbrowser.exe. File downloading is an example of an operation by which the virus (Malware.exe) first intruded into the client device 10. Accordingly, a timing at which the virus (Malware.exe) first intruded into the client device 10 can be determined based on the operation name 601.

FIG. 7 shows an example of backtracking in a case of virus infection by a removable device. In this example, copy source information 701 indicating a copy source of a file is added to an operation history 600. As described above, the virus intrusion route searching unit 202 backtracks the operation history further in the past according to the process name, and finds "file copy" that is an operation involved in the first intrusion, as an operation name. The copy source information 701 in the found record shows that the removable device is a copy source. Therefore, the virus intrusion route searching unit 202 specifies that the virus (Malware.exe) intruded via the removable device. Note that if a product ID, a vender ID, a serial ID, and the like of the removable device are recorded in the record of the operation history 600, it is possible to specify the particular removable device.

FIG. 8 shows an example of backtracking in a case of virus infection via a file sharing protocol. As described above, the virus intrusion route searching unit 202 backtracks the operation history further in the past according to the process name, and finds "file copy" that is an operation involved in the first intrusion, as an operation name. In the copy source information 701 in the found record, the path name indicating the copy source is recorded, and the path name includes \\, which indicates copy from a network drive. Therefore, the virus intrusion route searching unit 202 specifies that the virus (Malware.exe) intruded via the network drive (file sharing protocol).

FIG. 9 shows an example of backtracking in a case of virus infection by an e-mail MUA. The virus intrusion route searching unit 202 backtracks the operation history further in the past according to the process name, and finds "new creation" that is an operation that may be involved in the first intrusion, as an operation name. However, the process that has created a new file with the virus (Malware.exe) is an OLE-related process (for example: Reader.exe), and may be called from another process (parent process). Therefore, the virus intrusion route searching unit 202 searches the operation contents of the time and date that is close to the time and date of the other process, and finds the operation content that is "file open". That is, it is apparent that the virus (Malware.exe) is a virus that was created due to vulnerability of Reader.exe when ABCD.pdf was opened by Reader.exe. The virus intrusion route searching unit 202 newly searches for the time and date at which the file with the file name (ABCD.pdf) was first saved and its operation content. As a result, the virus intrusion route searching unit 202 can specify that the virus intruded via the file (ABCD.pdf) attached to the e-mail received from an e-mail address (a@b.c.jp) by the e-mail MUA (Mailer.exe).

In this way, with respect to the process used for opening a file that may be called by a parent process using the OLE, the process name was registered in advance in a table, and if this process name is found from the operation history by searching, it is possible to find the actual intrusion entry by searching the operation history for the parent process that called this process.

FIG. 10 is a flowchart showing an example of the virus intrusion route search processing (backtracking).

In step S1001, the virus intrusion route searching unit 202 searches the operation history based on virus information (for example: the process name or the like) received from the virus detecting unit 203.

In step S1002, the virus intrusion route searching unit 202 sorts records found by the search in order of the operation time and date recorded therein. Note that the sort processing may be omitted.

In step S1003, the virus intrusion route searching unit 202 examines the records in order from the new record to the old record, and determines whether or not the file names recorded in the records include an intrusion-related operation (for example: e-mail reception, web browsing, downloading, new creation, file copy/migration from a removable device, file copy/migration using a file sharing protocol, or the like). If the operation names do not include the intrusion-related operation, the procedure advances to step S1004. If the operation names include the intrusion-related operation, the procedure advances to step S1006. In step S1006, the virus intrusion route searching unit 202 extracts necessary information from the found record that is involved in virus intrusion and creates a search result.

In step S1004, the virus intrusion route searching unit 202 searches for the next newer record than the record that was just examined of the plurality of records found by the search, and examines that record.

In step S1005, the virus intrusion route searching unit 202 ends the backtracking if there is not the next newer record, and the procedure advances to step S1006. In step S1006, the virus intrusion route searching unit 202 puts together virus movement routes (file copy, file migration, or the like) that were found until the end of the backtracking as a search result. On the other hand, if there is the next newer record, the procedure returns to step S1003, where the virus intrusion route searching unit 202 examines the file name and the like that are recorded in the next newer record.

Note that in the determination processing of the intrusion-related operation in step S1003, backtracking is continued, taking into consideration the relationship of parent-child processes, renaming of the file, and the like, as shown in FIG. 9.

Note that backtracking that is executed in the server device 20 basically has the procedure shown in FIG. 10. Note that when generating a search result, the virus intrusion route searching unit 222 of the server device 20 generates a search result as a whole, reflecting the search result received from the client device 10. For example, if the client device 10 performs searching from Oct. 11, 2013 to Sep. 11, 2013 and the server device 20 performs searching from Sep. 10, 2013 to Sep. 11, 2012, the server device 20 will generate, as a search result, a backtrack result from Oct. 11, 2013 to Sep. 11, 2012.

As described above, according to the present embodiment, by storing in advance an operation history, it is possible to backtrack a virus intrusion or a virus movement route by searching for the operation history. Note that the virus intrusion route searching unit may be included in either or both of the terminal device and the server device. If the virus intrusion route searching unit is provided only in the terminal device, it is relatively easy to search for a virus intrusion route. If the virus intrusion route searching unit is provided only in the server device, there is the advantage that the load of searching by a terminal device can be mitigated. Furthermore, if virus intrusion route searching units are provided in both the terminal device and the server device and even if the terminal device cannot completely specify the intrusion route, the server device will be able to specify the first intrusion entry. Furthermore, virus intrusion entries can be classified into several types. Therefore, backtracking may be executed until a specific operation content that can be an intrusion operation appears and thereby the intrusion entry may be specified. That is, if no specific operation content was found even though backtracking was executed to track an operation history, it is possible to determine that the searching failed. Furthermore, as a result, it is also possible to request the server device to perform searching.

Note that if an intrusion entry seems to be found but the operation is executed by a child process, it will be possible to find the actual intrusion entry by further specifying the parent process.

According to the above-described embodiment, it is possible to determine an intrusion entry via which a virus intruded with respect to a client device 10. However, in the case of virus infection by copying a file from a file server using a file sharing protocol in a network, it is important who has uploaded this file. On the other hand, the server device 20 holds respective operation histories of a plurality of client devices 10 under its control. Therefore, if a name (path name) of a virus-infected file and the virus-infected operation time and date are recognized, the server device 20 can specify another client device 10 that has uploaded (copied) this file onto the file server. Furthermore, the server device 20 can specify, based on the operation history, how this file was operated (copied, renamed, downloaded, or saved) in the other client device 10. Therefore, the virus intrusion route searching unit 222 of the server device 20 can also specify a virus intrusion route in domains that share the file using the file sharing protocol.

Note that in the above-described embodiment, it is assumed that the virus intrusion route searching unit 202 is provided in the client device 10, but the virus intrusion route searching unit 222 may also be provided only in the server device 20. In this case, the agent service 201 may transfer all operation histories to the server device 20, and further transmit the virus detection information from the virus detecting unit 203 together with the search request to the server device 20.

Furthermore, the virus detecting unit 203 can detect a script-type virus, a virus that is saved in a registry, and a virus expanded in memory. Therefore, the virus intrusion route searching unit 202 may specify the process in which a script was executed, the process in which a virus code was written into a registry, and the process in which a virus was expanded into memory, from the operation histories, and specify the URL of a site on which the script was downloaded, the source from which the file including the virus code written into the registry comes, and the route of entry of the process in which a virus was expanded into memory.

Backtracking in a case where a file or a program is executed via a network

As shown in FIG. 11, in the Internet or an Intranet, a plurality of client devices 10a, 10b, 10c, and 10d are connected to the network 100. The client device 10a includes a folder 1101 that is accessible, for example, using SMB or the like. The path name of the folder 1101 is, for example, \\ClientA. In the folder 1101, an arbitrary file (here, Malware.pdf) is stored. The client devices 10b and 10c are permitted to access this folder and perform a file operation, such as opening or copying of this file. Under such presumption, when the client devices 10b and 10c operated a file of the folder 1101 by performing a process (Viewer.exe), the virus detecting unit 203 has detected a virus. In such a case, the virus intrusion route is determined to be a route via another terminal device. Note that the following description will be given assuming that "Client A" is an example of identification information of the client device 10a, "Client B" is an example of identification information of the client device 10b, and "Client C" is an example of identification information of the client device 10c.

Figure 12:
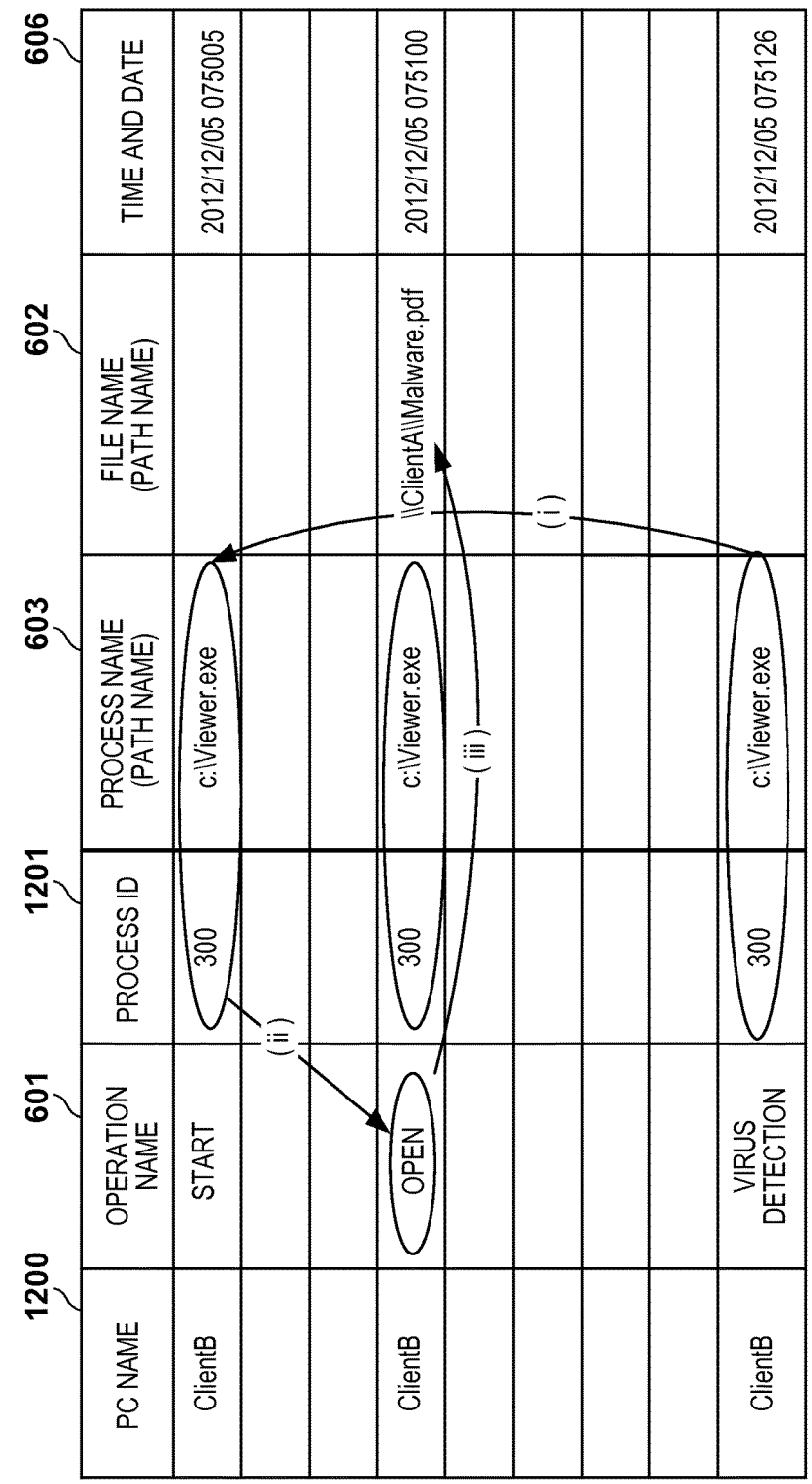
FIG. 12 is a diagram showing an example of backtracking based on an operation history.

FIG. 12 shows an example of backtracking. The operation history 600 includes a PC name 1200, which is identification information of a client device that has executed an operation, and a process ID, which is process identification information.

(i) When the virus detecting unit 203 has detected a virus, the virus intrusion route searching unit 202 acquires, based on the virus detection information, process identification information (the process name 603 and the process ID 1201) of the process that is determined to relate to the virus. Furthermore, the virus intrusion route searching unit 202 searches the operation history 600 according to the process identification information, and finds the operation history records indicating that this process was activated.

(ii) The virus intrusion route searching unit 202 determines, from among records having the same process identification information, an operation history record showing that the process opened a file in a period from the time at which the process started to the time at which the virus was detected.

(iii) The virus intrusion route searching unit 202 acquires the path name of a file included in the found record. The virus intrusion route searching unit 202 recognizes that the file is a file shared in a network because the acquired path name includes \\, and further specifies that the virus intruded into the client device 10b via the client device 10a because the path name includes "Client A", which is the identification information of the client device 10a.

Note that by the virus intrusion route searching unit 202 giving the found path name to the virus intrusion route searching unit 222 of the server device, the virus intrusion route searching unit 222 of the server device may further determine further details of the intrusion route. In the operation history database 224 of the server device 20, operation histories of a plurality of terminals are recorded. Therefore, the virus intrusion route searching unit 222 can track file movement between the plurality of client devices. Upon receiving a request from the virus intrusion route searching unit 202, the virus intrusion route searching unit 222 backtracks the path in which the file is written into the folder 1101 in accordance with the request (path name). Accordingly, a virus intrusion route to the client device 10a can also be determined.

In this way, the operation history database 224 provided in the server device 20 has stored operation histories acquired from a plurality of terminal devices, and, when a virus was found in one of the plurality of terminal devices, the virus intrusion route searching unit 222 provided in the server device 20 searches the operation histories of the plurality of terminal devices based on the path name or the identification information of the process that is related to the virus, and determines a virus intrusion route.

Figure 13:
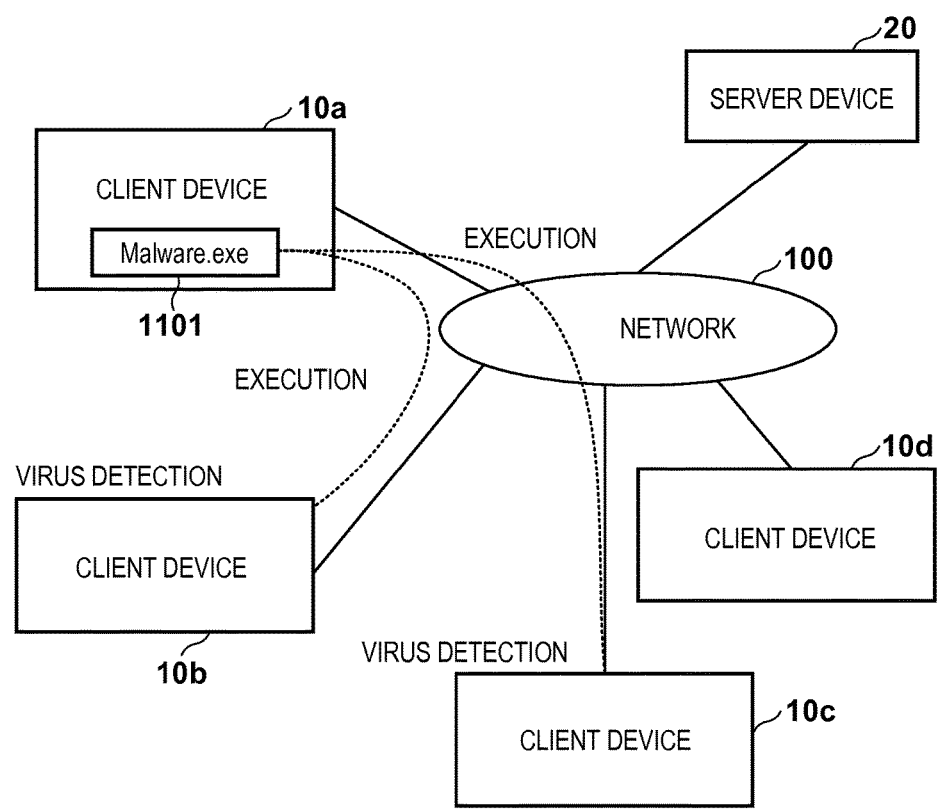
FIG. 13 is a diagram showing an example of the virus infection route.

FIG. 13 shows a case where a virus was found in the client device by execution of a file stored in a network folder. Assume here that the file "Malware.exe" in question is stored in the folder 1101 of the client device 10a, and other client devices 10b and 10c executed the file.

FIG. 14 shows an example of backtracking.

(i) When the virus detecting unit 203 of the client device 10b has detected a virus, the virus intrusion route searching unit 202 acquires, based on the virus detection information, process identification information (the process name 603 and the process ID 1201) of the process that was determined to relate to the virus. In FIG. 14, the path name "\\ClientA\\Malware.exe" is saved in the process name 603. Furthermore, the virus intrusion route searching unit 202 searches the operation history 600 in accordance with the process identification information, and finds the operation history record showing that this process was activated.

(ii) The virus intrusion route searching unit 202 determines, from among records having the same process identification information, an operation history record showing that the process opened a file in a period from the time at which the process started to the time at which the virus was detected. In the case shown in FIG. 14, there is the record showing that another process opened a text file, but the virus-related process (\\ClientA\\Malware.exe) did not execute any file operation. Therefore, the virus intrusion route searching unit 202 determines that the process (\\ClientA\\Malware.exe) itself is a virus, and the client device 10a is an intrusion entry based on the path name thereof.

Here, the description has been given in which the client device 10 determines an intrusion route, but it is also possible that, as already mentioned, only the server device 20 determines an intrusion route, or the virus intrusion route searching unit 202 of the client device 10 and the virus intrusion route searching unit 222 of the server device 20 execute the virus intrusion route determination processing in cooperation with each other. In operation history storage unit provided in the server device 20, the operation history that covers a longer period than the operation history stored in the operation history storage unit provided in the client device 10 is stored. Therefore, when the client device 10 cannot completely determine an intrusion route only based on the operation history stored in the client device 10, the client device 10 may request the server device 20 to backtrack a further past operation history. The server device 20 searches the past operation history in accordance with the request received from the client device 10.

FIG. 15 is a flowchart showing the procedure of backtracking that is executed by the server device. The backtracking will be described as being executed by the client device 10, but part or all thereof may be executed by the server device 20.

In step S1501, the virus intrusion route searching unit 202 determines whether or not the virus detecting unit 203 of the client device 10 has detected a virus. (If the virus intrusion route searching unit 222 of the server device 20 executes backtracking, the agent service 201 of the client device 10 notifies, upon the virus detecting unit 203 detecting a virus, the virus intrusion route searching unit 222 of the detection of the virus.) If a virus is detected, the procedure advances to step S1502.

In step S1502, the virus intrusion route searching unit 202 acquires the above-described virus detection information from the virus detecting unit 203 of the client device 10.

In step S1503, the virus intrusion route searching unit 202 determines whether or not a process that is specified by process identification information included in the virus detection information opened a file, based on the operation history 600 stored in the operation history database 204. Note that if the server device 20 executes backtracking, the virus intrusion route searching unit 222 may instruct the respective client devices 10 to transfer the operation histories to the server device 20. Accordingly, the latest operation histories can be defined as targets for searching. If the process opened a file, the procedure advances to step S1504.

In step S1504, the virus intrusion route searching unit 202 determines whether or not the file path of the opened file starts with the specific sign "\\" indicating that the file is a network share file. If the file path starts with the sign "\\", the procedure advances to step S1505.

In step S1505, the virus intrusion route searching unit 202 recognizes that the virus-related file is present on the network.

In step S1506, the virus intrusion route searching unit 202 determines the client device that holds the virus based on the path name of the virus-related file.

In step S1507, the virus intrusion route searching unit 202 determines whether or not to further search the operation history of the client device that holds the virus. For example, if the client device that holds the virus is the virus intrusion route searching unit 202 itself, the virus intrusion route searching unit 202 will need to search the database 204 further in the past. In this case, the virus intrusion route searching unit 202 searches the database 204 further in the past. On the other hand, the client device that holds the virus is another terminal, the virus intrusion route searching unit 202 cannot execute further searching, and thus needs to request the server device 20 to perform searching. Furthermore, when the virus intrusion route searching unit 202 searches the database 204 further in the past, there may be the case where operation histories are lacking. In this case, the procedure advances to step S1508.

In step S1508, the virus intrusion route searching unit 202 requests the server device 20 via the agent service 201 to perform searching. The request includes identification information of the other client device that is a target for searching, the path name of the file, and the like. The virus intrusion route searching unit 222 of the server device 20 determines an intrusion route in accordance with the request.

Backtracking in a case where a virus file is attached to an e-mail, an e-mail recipient transfers the virus file to another person without opening the virus file, and the transfer destination is infected by the virus.

FIG. 16 shows the case of virus infection by e-mail transfer. If a virus is attached to an e-mail, the virus is detected by the virus detecting unit 203 when the attached file is executed. Therefore, even if the e-mail is received, the virus is not likely to be detected when the attached file is directly transferred without being operated.

According to FIG. 16, it is assumed that the client device 10*c* received an e-mail from an external sender, and transferred this e-mail to the client device 10*b* without operating an attached file. It is furthermore assumed that the client device 10*b* also transferred this e-mail to the client device 10*a* without operating the attached file. It is assumed that the client device 10*a* unfortunately executed the attached file of this e-mail and detected a virus. In this case, the client device 10*a* can determine, based on the above-described procedure, that the virus intruded via the client device 10*b*, but cannot determine a previous intrusion route.

On the other hand, the server device 20 has also stored operations of e-mail MUA's of the plurality of client devices 10*a* to 10*d* as operation histories. Therefore, the virus intrusion route searching unit 222 of the server device 20 can use the database 224 to backtrack a more detailed intrusion route.

FIG. 17 shows an example of backtracking of a virus intrusion route in which e-mail transfer is involved. Assume here that the virus intrusion route searching unit 222 of the server device 20 executes backtracking.

(i) The virus detecting unit 203 detects a virus, and gives the process name 603 and the process ID 1201 that are related to the virus to the virus intrusion route searching unit 222 via the virus intrusion route searching unit 202 and the agent service 201. The agent service 201 gives the PC name as well to the virus intrusion route searching unit 222. The virus intrusion route searching unit 222 searches the database 224 for the operation history at the start of this process, based on the process name 603, the process ID 1201, and the PC name that are related to the virus and included in the virus detection information.

(ii) When having found the operation history at the start of the process, the virus intrusion route searching unit 222 further searches the database 224, based on the path name of the executable file of this process, for the operation history that was recorded when the executable file was newly created. Here, it is apparent that a virus-related executable file (Malware.exe) was created by the e-mail MUA.

(iii) The virus intrusion route searching unit 222 searches for and extracts the operation history when the e-mail MUA received the executable file (Malware.exe) as an attached file. Furthermore, the virus intrusion route searching unit 222 extracts a sender e-mail address 1701 recorded in the found operation history record, and thereby specifies another client device 10*b* that has transmitted the e-mail.

Note that the items (i) to (iii) may also be executed by the client device 10*a* that has detected the virus.

(iv) Based on the sender e-mail address 1701 and the attached file name 604, the virus intrusion route searching unit 222 searches for and extracts the operation history record showing that the attached file in question was received. The virus intrusion route searching unit 222 specifies another client device 10*c* that has transmitted the e-mail, by extracting the sender e-mail address 1701 included in this record.

(v) Based on the sender e-mail address 1701 and the attached file name 604, the virus intrusion route searching unit 222 searches for and extracts the operation history record showing that the attached file in question was received. The virus intrusion route searching unit 222 specifies the external sender (unknown@malware.jp) that has transmitted the e-mail by extracting the sender e-mail address 1701 included in this record. Note that it is specified that the first intrusion entry under the management of the server device 20 is the client device 10c.

Furthermore, the virus intrusion route searching unit 222 may determine not only the sender of the e-mail based on the operation history when the e-mail MUA received the executable file (Malware.exe) as an attached file, but also the sender of the e-mail based on the e-mail information (open log of the e-mail) that was opened by the e-mail MUA immediately before the e-mail MUA newly created the executable file.

FIG. 25 shows another example of backtracking of a virus intrusion route in which e-mail transfer is involved. Assume here that the virus intrusion route searching unit 222 of the server device 20 executes backtracking.

(i) The virus detecting unit 203 has detected a virus, and gives the process name 603 and the process ID 1201 that are related to the virus to the virus intrusion route searching unit 222 via the virus intrusion route searching unit 202 and the agent service 201. The agent service 201 gives the PC name as well together with these pieces of information, as virus detection information, to the virus intrusion route searching unit 222. The virus intrusion route searching unit 222 searches the database 224 for the operation history at the start of this process, based on the process name 603, the process ID 1201, and the PC name that are related to the virus and included in the virus detection information.

(ii) When having found the operation history at the start of the process, the virus intrusion route searching unit 222 further searches the database 224, based on the path name of the executable file of this process, for the operation history that was recorded when the executable file was newly created. Here, it is apparent that a virus-related executable file (Malware.exe) was created by the e-mail MUA.

(iii-i) The virus intrusion route searching unit 222 searches for and extracts the operation history when the e-mail MUA received the executable file (Malware.exe) as an attached file. Furthermore, the virus intrusion route searching unit 222 extracts a sender e-mail address 1701 recorded in the found operation history record, and thereby determines another client device 10b that has transmitted the e-mail.

Furthermore, it is also possible to specify another client device 10b that has transmitted the target e-mail in the route (iii-ii), instead of the route (iii-i).

(iii-ii) The virus intrusion route searching unit 222 extracts e-mail information of the e-mail (open log of the e-mail) that was opened by the corresponding e-mail MUA immediately before the e-mail MUA newly created the executable file (Malware.exe), and extracts the e-mail reception log that has the matched Message ID, the e-mail reception log being recorded in the open log of the e-mail. Furthermore, the virus intrusion route searching unit 222 determines another client device 10b that has transmitted the e-mail, by extracting the sender e-mail address 1701 recorded in the found operation history record.

Furthermore, the virus intrusion route searching unit 222 may also specify another client device 10b that has transmitted the corresponding e-mail using (iii-i) and (iii-ii) in combination.

Note that the steps (i) to (iii-ii) may also be executed by the client device 10a that has detected the virus.

(iv) Based on the sender e-mail address 1701 and the attached file name 604, the virus intrusion route searching unit 222 searches the database 224 for the operation history record showing that the attached file in question was received, and extracts the found operation history record. The virus intrusion route searching unit 222 specifies another client device 10c that has transmitted the e-mail, by extracting the sender e-mail address 1701 included in this record.

(v) Based on the sender e-mail address 1701 and the attached file name 604, the virus intrusion route searching unit 222 searches the database 224 for the operation history record showing that the attached file in question was received, and extracts the found operation history record. The virus intrusion route searching unit 222 specifies the external sender (unknown@malware.jp) that has transmitted the e-mail, by extracting the sender e-mail address 1701 included in this record. Note that it is specified that the first intrusion entry under the management of the server device 20 is the client device 10c.

Figure 18:
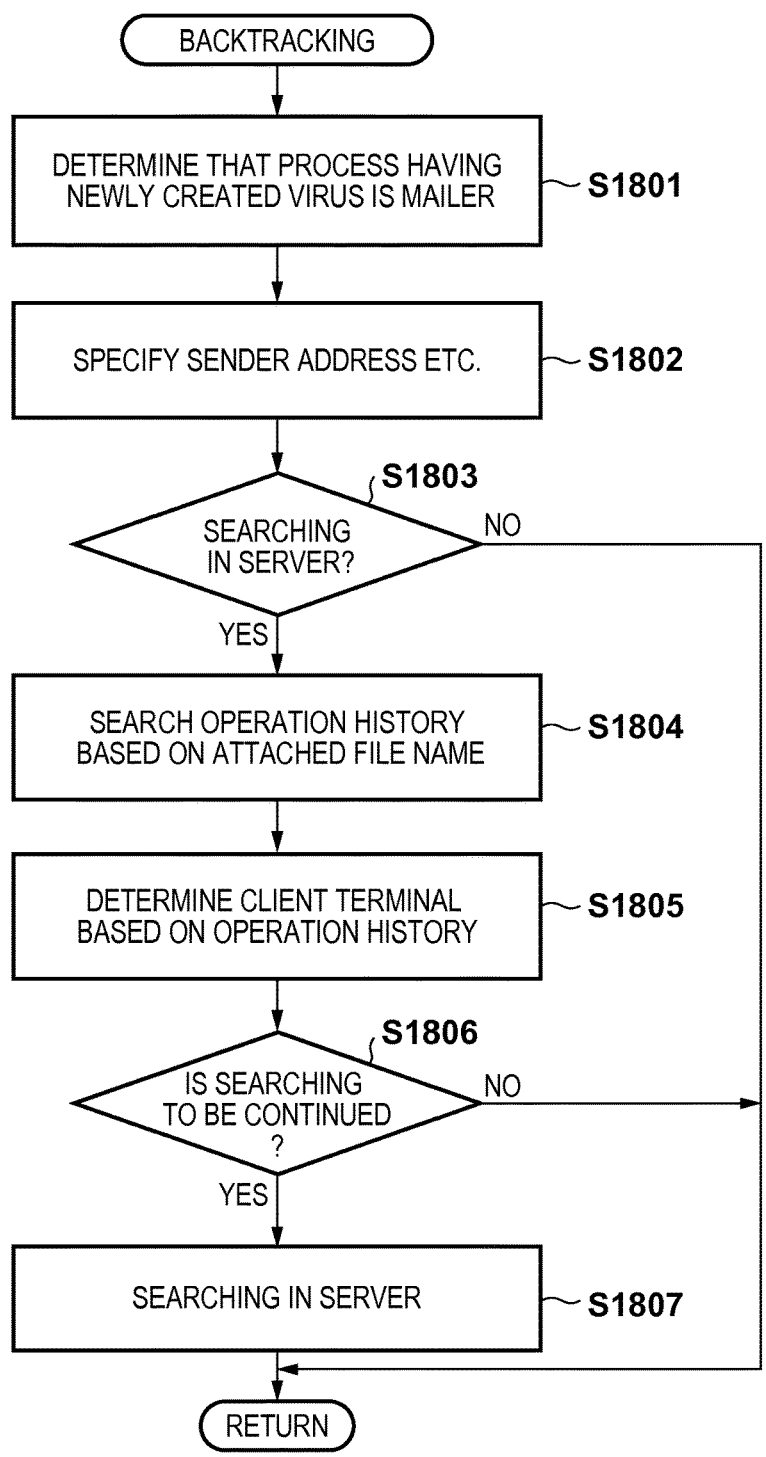
FIG. 18 is a flowchart showing an example of backtracking.

FIG. 18 is a flowchart showing the procedure of backtracking. Steps S1801 to S1803 are executed by the client device that has detected a virus and steps S1804 to S1807 are executed by the server device 20.

In step S1801, the virus intrusion route searching unit 202 determines that the process that created an executable file with the virus is a process of an e-mail MUA, based on the virus detection information and the operation history 600.

In step S1802, the virus intrusion route searching unit 202 searches the database 204 for the operation history relating to the e-mail MUA, extracts the found operation history, and specifies the sender address from which the virus-related attached file was transmitted.

In step S1803, the virus intrusion route searching unit 202 determines whether or not to request the server device 20 to perform searching, based on whether the sender address is an address in the same domain or an address outside the same domain. If the sender address is an address outside the same domain, the intrusion entry was determined and thus backtracking ends. On the other hand, if the sender address is an address in the same domain, backtracking can be continued from the database 224 of the server device 20. Accordingly, if the sender address is an address in the same domain, the procedure advances to step S1804.

In step S1804, the virus intrusion route searching unit 222 of the server device 20 searches the database 224 based on the file name attached to the search request from the client device 10, and extracts the operation history in which this attached file was received.

In step S1805, the virus intrusion route searching unit 222 determines the terminal that may hold the virus (client device that has transmitted the attached file), based on the e-mail address information (sender address 1701) of the found operation history.

In step S1806, the virus intrusion route searching unit 222 determines whether or not to further backtrack an operation history of another client device, based on the address information of the terminal that may hold the virus. If the address of the terminal that may hold the virus is an address in the same domain, the operation history is saved in the database 224. Therefore, the virus intrusion route searching unit 222 advances the procedure to step S1807 in order to further execute searching. In step S1807, the virus intrusion route searching unit 222 executes steps S1804 to S1806. By repeatedly executing steps S1804 to S1807, the virus intrusion route searching unit 222 specifies the sender (client terminal) that has first transmitted the virus-related attached file in the same domain. As described above, the client terminal that received the e-mail with the attached file from the outside and transferred the e-mail to another address in the same domain is specified. On the other hand, if the address of the terminal that may hold the virus is an address outside the same domain, the intrusion entry was specified and thus backtracking ends.

A case where a virus moved between a plurality of client devices via a removable device.

As described above, a removable device such as a USB memory can be used between a plurality of client devices. Therefore, a virus-related file may physically be delivered via the removable device. If a virus is detected from a file that is read out from the removable device by any one of the client devices, it is meaningful to specify by which client device and in which removable device this file was written.

Figure 19:
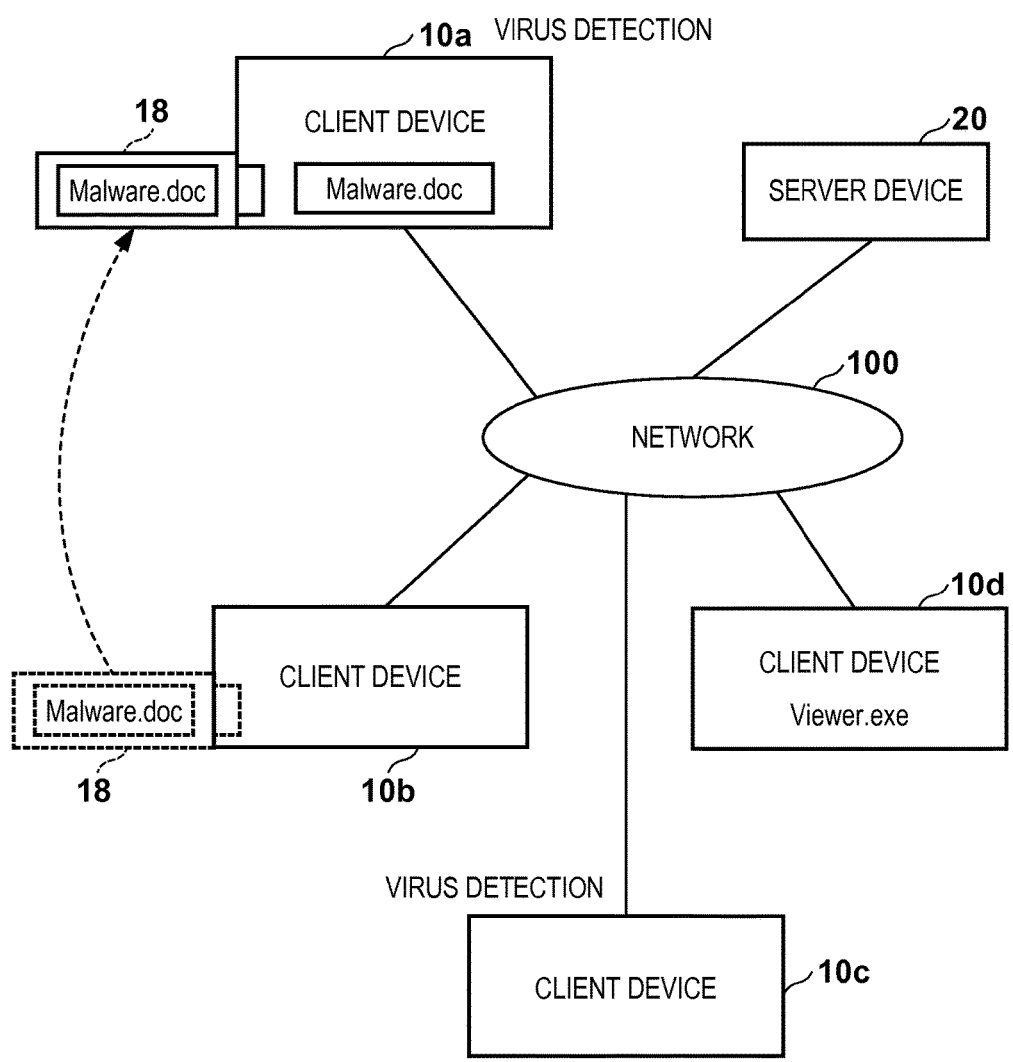
FIG. 19 is a diagram showing an example of the virus infection route.

FIG. 19 shows that the client device 10b wrote a virus-related file (Malware.doc) into the removable device 18 attached (connected) to the client device 10b. Furthermore, the removable device 18 is connected to another client device 10a, and the virus-related file is copied into the storage device 15 of the client device 10a or opened by the CPU 11. As a result, the virus detecting unit 203 detects that the virus-related file (Malware.doc) includes a virus code.

Figure 20:
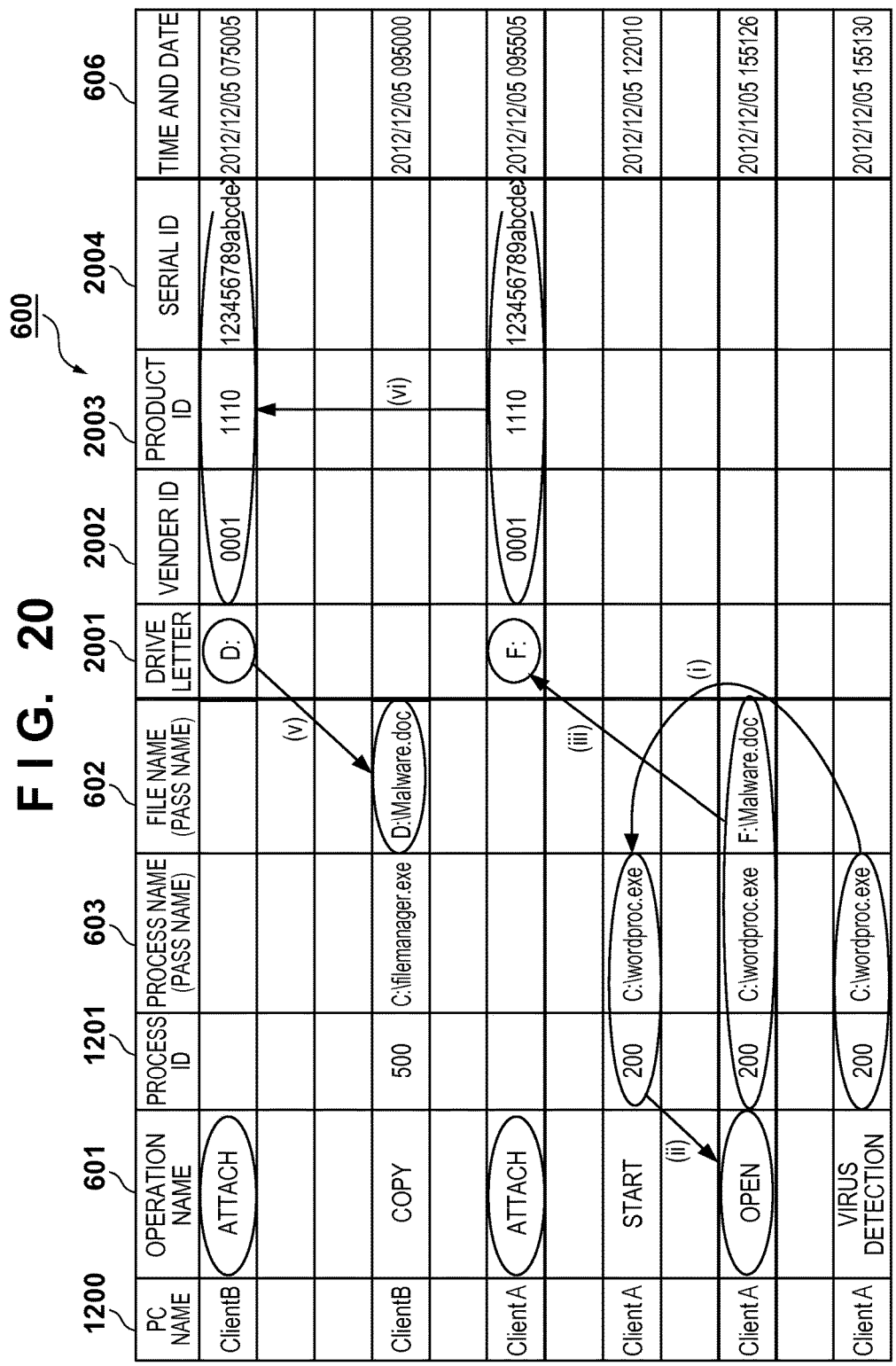
FIG. 20 is a diagram showing an example of backtracking based on an operation history.

FIG. 20 shows an example of backtracking.

(i) The virus detecting unit 203 detects that document editing software (wordproc.exe) has executed the virus code. In order to search for the operation history indicating that the document editing software (wordproc.exe), which is a virus-related process, was activated, the virus intrusion route searching unit 202 search the database 204 based on the virus detection information (process name 603 and the process ID 1201) received by the virus detecting unit 203. As a result, the virus intrusion route searching unit 202 found the operation history record indicating that the virus-related process was activated.

(ii) When having found the operation history at the start of the process, the virus intrusion route searching unit 202 determines the operation history record indicating that this process opened a file between the time at which the process was started and the time at which the virus was detected, from among records having the same process identification information. The virus intrusion route searching unit 202 acquires, when having found this record, the path name (Malware.doc) of the opened file from this record. The virus intrusion route searching unit 202 recognizes that the drive letter included in the path name is the drive letter assigned to the removable device.

(iii) The virus intrusion route searching unit 202 searches the database 204 for the operation history record indicating that the removable device to which the drive letter "F:" is assigned was attached, and extracts the found operation history record.

(iv) The virus intrusion route searching unit 202 extracts, from the found record, the identification information (such as the vender ID 2002, the product ID 2003, or the serial ID) of the removable device. Furthermore, the virus intrusion route searching unit 202 transmits, to the server device 20, the extracted identification information of the removable device and the path name (Malware.doc) of the virus-related file, the identification information and the path name being attached to a search request.

(v) When having received the search request, the virus intrusion route searching unit 222 of the server device 20 searches the database 224 based on the identification information of the removable device 18 and determines the operation history record that the removable device 18 was attached. In this stage, it is apparent to which client device the removable device 18 is connected. Furthermore, the virus intrusion route searching unit 222 determines the drive letter assigned to the removable device 18 based on this record, creates a path name (D:\Malware.doc) by adding the drive letter to the path name (Malware.doc) of the virus-related file, and searches for and extracts the operation history record including the created path name. In this example, it is apparent that the file in question was written into the removable device in the client device 10b by the file management software (filemanager.exe).

Note that the intrusion route searching processing thereafter is as described above.

Figure 21:
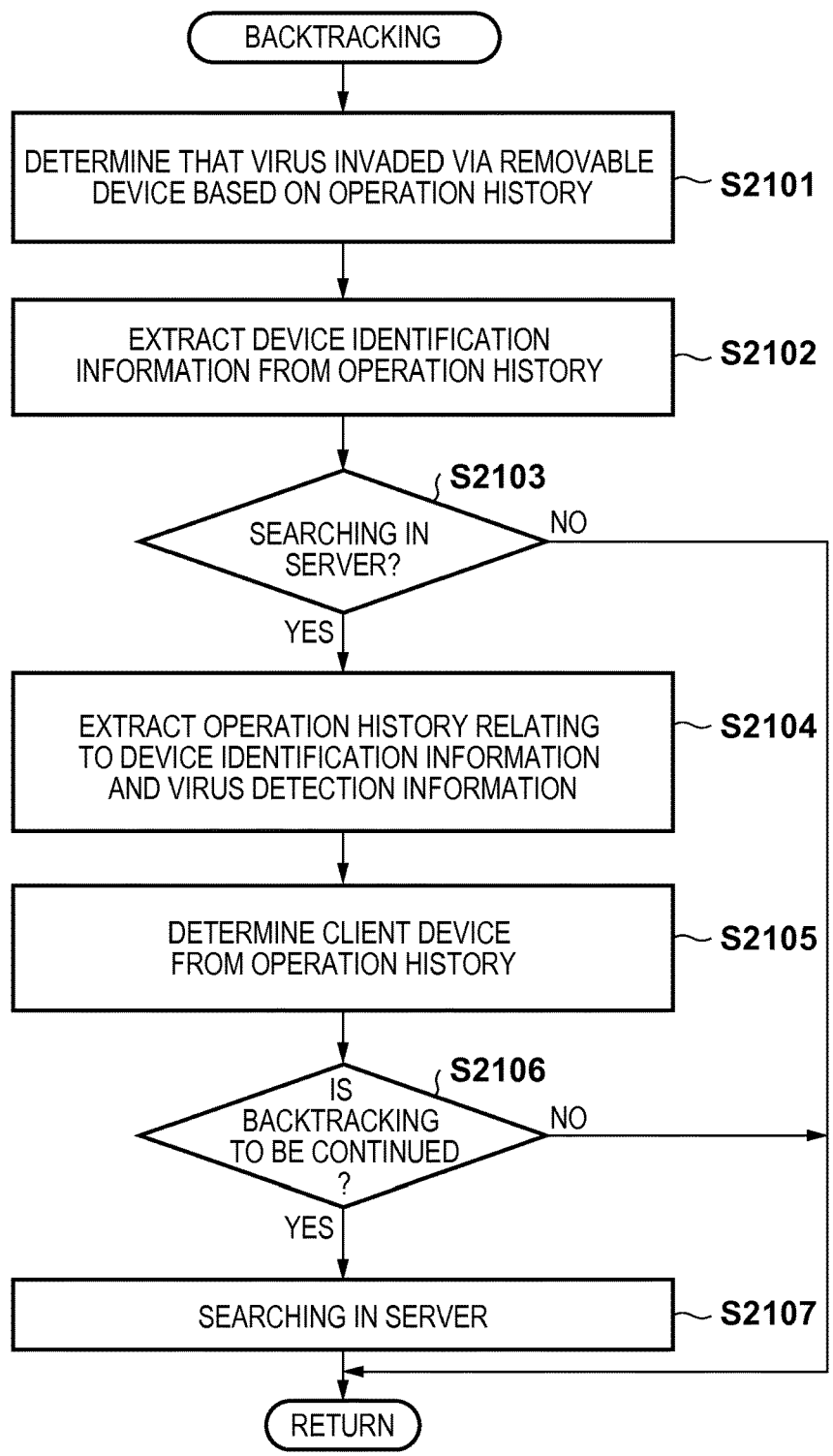
FIG. 21 is a flowchart showing an example of backtracking.
Figure 22:
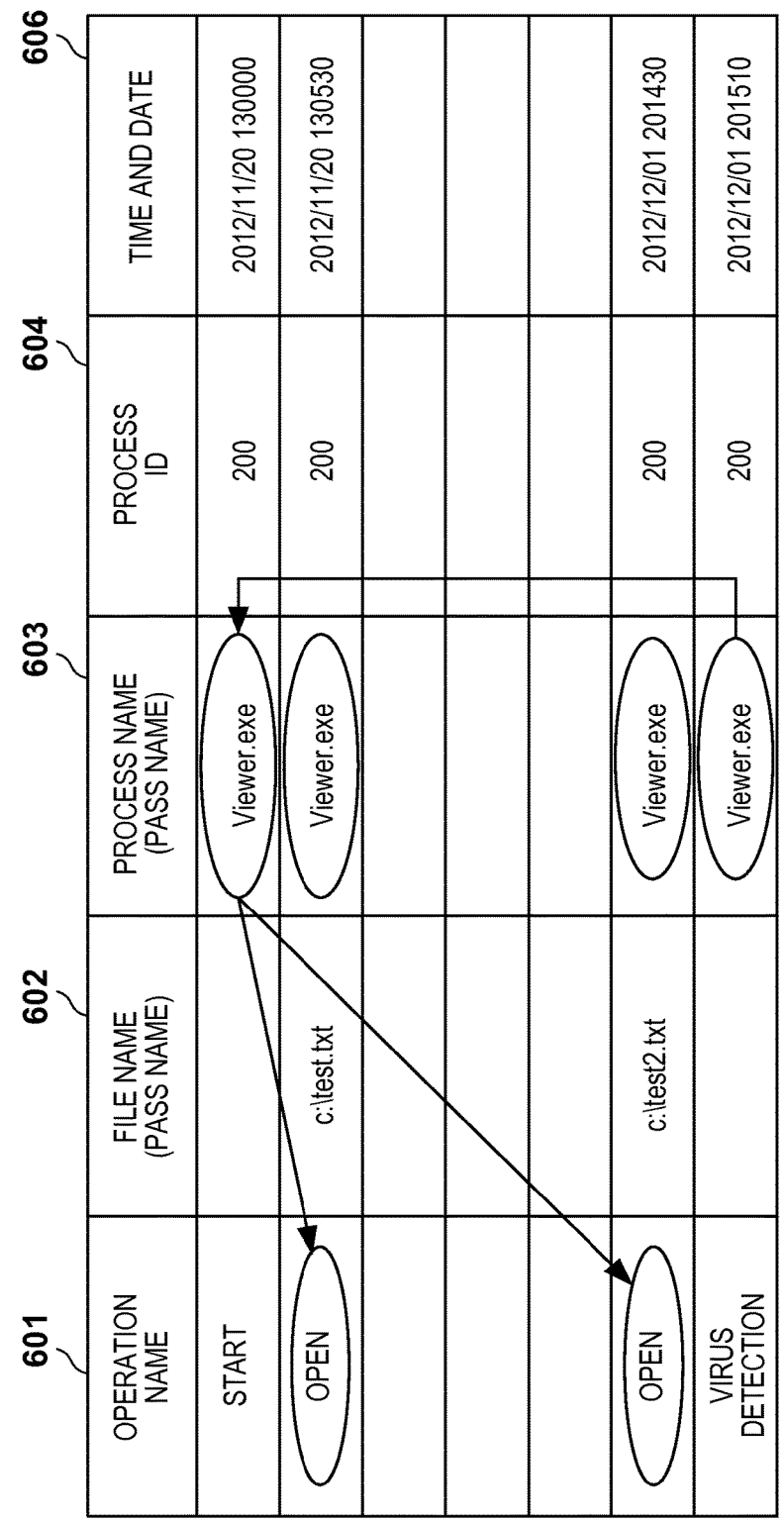
FIG. 22 is a diagram showing an example in which there are a plurality of backtrack results.

FIG. 21 is a flowchart showing the procedure of backtracking.

In step S2101, the virus intrusion route searching unit 202 determines that a virus intruded via the removable device 18 based on the path name of a file recorded in the operation history 600.

In step S2102, the virus intrusion route searching unit 202 extracts, from the operation history 600, the identification information (for example, the vender ID 2002, the product ID 2003, or the serial ID) of the removable device 18.

In step S2103, the virus intrusion route searching unit 202 determines whether or not searching is performed by the server device 20. For example, if the server device 20 holds operation histories of a plurality of terminal devices, it is determined that searching is performed by the server. If it is determined that searching is not performed by the server device 20, backtracking ends, and if it is determined that searching is to be performed by the server device 20, a search request is transmitted to the server device 20 and the procedure advances to step S2104.

In step S2104, the virus intrusion route searching unit 222 of the server device 20 determines the operation history record that a virus file was stored into the removable device, from the operation history database 224, based on the identification information of the removable device and the path name of the virus file that are attached to the received search request.

In step S2105, the virus intrusion route searching unit 222 determines the client device that holds the virus based on the PC name included in the found operation history record.

In step S2106, the virus intrusion route searching unit 222 determines whether or not to further determine the operation history of the client device that holds the virus. For example, if the administrator of the server device 20 instructs execution of determination, the procedure advances to step S2107, where the virus intrusion route searching unit 222 further determines the intrusion route.

Accordingly, it is possible to determine whether the virus file comes from an e-mail or a website.

Narrowing-down in a case where two or more intrusion routes were found by backtracking When backtracking is performed as described above, there are often the case where the process opens a plurality of files between activation of the process and detection of a virus. In this case, there are a plurality of backtrack results, and thus it is not possible to determine which file is the virus-related file.

Therefore, in the present embodiment, the virus intrusion route searching unit 202 determines files operated between activation of the process and detection of a virus based on the process identification information of the process in which the virus was detected, and if a plurality of files are determined, the virus intrusion route searching unit 202 performs narrowing-down to one file that is related to the virus intrusion route by executing weighting with respect to the plurality of files.

Weighting may be executed based on, for example, at least one of the time and date at which the file was operated, the execution result of this file, the result obtained by executing virus detection on this file, virus information provided on a network, and information input by a user. Furthermore, processing for determining weighting may be performed based on information provided from an external system.

Figure 23:
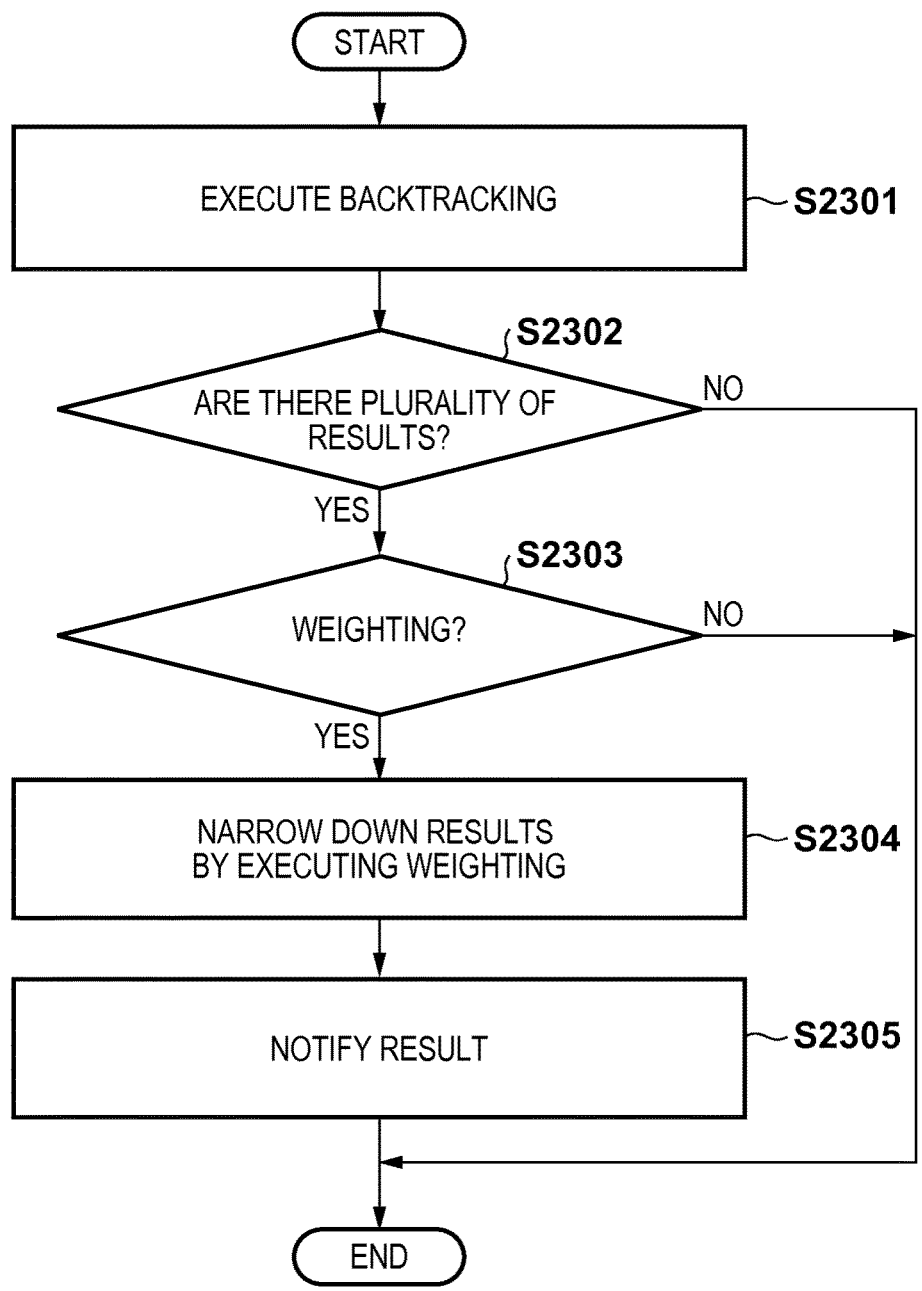
FIG. 23 is a flowchart showing weighting processing.

FIG. 23 is a flowchart showing the procedure of backtracking. This flowchart may be executed by the client device 10 or the server device 20. Here, description will be given assuming that the flowchart is executed by the client device 10.

In step S2301, the virus intrusion route searching unit 202 executes backtracking.

In step S2302, the virus intrusion route searching unit 202 determines whether or not there are two or more backtrack execution results. If a plurality of execution results are obtained, the procedure advances to step S2303, whereas if one execution result is obtained, the procedure advances to step S2305, where the execution result is transmitted to the server device 20.

In step S2303, the virus intrusion route searching unit 202 determines whether or not weighting is executed. For example, the administrator uses the keyboard and the pointing device to input whether or not weighting is executed. If weighting is not executed, the procedure advances to step S2305, where the plurality of execution results are notified to the server device 20. On the other hand, if weighting is executed, the procedure advances to step S2304.

In step S2304, the virus intrusion route searching unit 202 performs narrowing-down to one execution result that is related to the virus intrusion route, by executing weighting with respect to the plurality of execution results. Weighting may be executed based on, for example, at least one of the time and date at which the file was operated, the execution result of this file, the result obtained by executing virus detection with respect to the file, and information input by a user.

Figure 24:
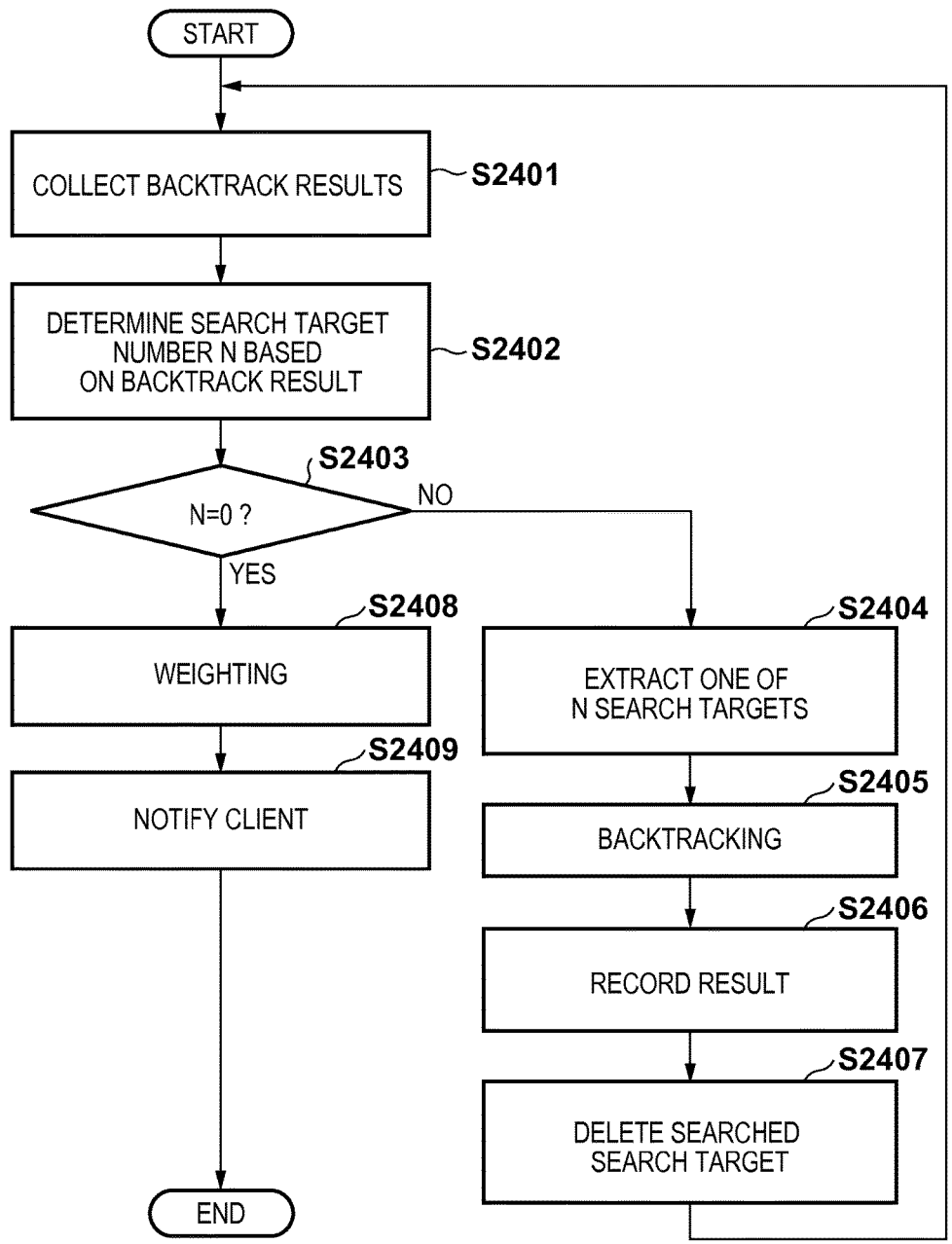
FIG. 24 is a flowchart showing the weighting processing in detail.

FIG. 24 is a flowchart showing weighting processing that is executed by the server device 20.

In step S2401, the virus intrusion route searching unit 222 acquires a backtrack result from the client device 10.

In step S2402, the virus intrusion route searching unit 222 determines the search target number N based on the acquired backtrack result. The number of the backtrack results is first substituted by N.

In step S2403, the virus intrusion route searching unit 222 determines whether or not the search target number N is zero. If the search target number N is not zero, the procedure advances to step S2404.

In step S2404, the virus intrusion route searching unit 222 arbitrary extracts one search target from among the N search targets.

In step S2405, the virus intrusion route searching unit 222 executes backtracking with respect to the extracted search target using the operation history database 224.

In step S2406, the virus intrusion route searching unit 222 writes a backtrack result into the storage device 25.

In step S2407, the virus intrusion route searching unit 222 deletes the currently found search target from among the N search targets, and further subtracts one from N. Then, the procedure returns to step S2401.

In step S2403, if N is zero, the procedure advances to step S2408.

In step S2408, the virus intrusion route searching unit 222 analyzes the recorded result and executes weighting.

In step S2409, the backtrack result specified by weighting is notified to the client device 10.

As described above, according to the present embodiment, a virus intrusion route specifying device that backtracks a virus intrusion route to a terminal device is provided. The operation history databases 204 and 224 function as an operation history storage unit configured to store an operation history, which is a history of operations executed in the corresponding terminal device. The virus intrusion route searching units 202 and 222 function as a determining unit configured to determine, when a virus is detected in the corresponding terminal device, the time and date at which the virus was first saved in the terminal device based on the operation history stored in the corresponding operation history storage unit, and determine a virus intrusion route based on an operation content that was executed at the specified time and date. According to the present invention, a virus infection route can be backtracked using an operation history in more detail than in the conventional case.

Furthermore, according to the present embodiment, the virus intrusion route determining device may be provided in the client device 10 or the server device 20. The virus intrusion route determining device, if provided in the client device 10, can determine an intrusion route even in a stand-alone environment. The virus intrusion route determining device, if provided in the server device 20, can mitigate the load of determination processing by the client device 10.

Furthermore, the client device 10 may also include the virus detecting unit 203, which functions as virus detection unit configured to detect a virus, the agent service 201, which functions as a request transmitting unit configured to transmit a request for determining a virus intrusion route detected by the virus detection unit to the server device, and the virus intrusion route searching unit 202. It would be possible not only to mitigate the load of the client device 10 but also for the server device to specify a route in more detail.

The virus intrusion route determining devices may also be provided in both the client device 10 and the server device 20 connected to the client device 10. The virus intrusion route determining device provided in the client device 10 and the virus intrusion route determining device provided in the server device 20 may cooperate with each other to determine a virus intrusion route to the terminal device. Accordingly, the loads can be distributed. Furthermore, the number of operation histories that are stored in the client device 10 can be reduced.

The client device 10 may further include: an operation history management unit configured to transfer an operation history stored in the operation history storage unit of the client device 10 so that it is stored in the server device and deleting all or part of the transferred operation history; the agent service 201 that functions as a request transmitting unit configured to transmit, to the server device, a request for specifying a virus intrusion route based on the operation history stored in the server device if the determining unit cannot determine the virus intrusion route based on the operation history stored in the operation history storage unit; and the virus intrusion route searching unit 202.

Furthermore, the virus intrusion route searching units 202 and 222 may determine an intrusion entry via which a virus intruded into a terminal device by determining whether or not an operation content included in each of records constituting the operation history is a specific operation content that is executed at the time of virus intrusion.

Furthermore, the virus intrusion route searching units 202 and 222 may also determine a virus intrusion route by searching the operation history for a parent process that called a child process that is involved in saving of a virus.

In the operation history storage unit (database 224) provided in the server device 20, the operation history that covers a longer period than the operation history stored in the operation history storage unit (database 204) provided in the client device 10 may be stored.

Furthermore, the determining unit (virus intrusion route searching unit 222) provided in the server device 20 may specify a virus intrusion route with respect to an operation history acquired during a time period that is further past than the time period in which the determining unit (virus intrusion route searching unit 202) provided in the terminal device conducted an examination.

Furthermore, in the operation history storage unit provided in the server device 20, operation histories acquired by a plurality of terminal devices are stored, and when having found a virus in one of the plurality of terminal devices, the determining unit provided in the server device 20 may search the operation histories of the plurality of terminal devices based on the path name related to this virus or the identification information of the process, and determine a virus intrusion route.

Furthermore, the virus intrusion route searching units 202 and 222 may search the corresponding operation history storage unit for the path name of a file operated between activation of the process and detection of the virus based on the process identification information of the process in which a virus was detected, and determine the terminal device that provided the file based on the path name found by searching.

Furthermore, the virus intrusion route searching units 202 and 222 may search the corresponding operation history storage unit for the path name of a file operated between activation of the process and detection of the virus based on the process identification information of the process in which a virus was detected, and may recognize the process itself as a virus if no file operated between activation of the process and detection of the virus was found.

Furthermore, the virus intrusion route searching units 202 and 222 may determine another process that created an executable file of the process based on the process identification information of the process in which a virus was detected, determine whether or not the other process is a process of a mailer, determine an operation history indicating that the e-mail MUA received an e-mail to which the executable file of the process is attached, determine a sender of the e-mail based on the operation history, specify an operation history indicating that the sender transferred the e-mail, determines an operation history indicating that the sender who has transferred the e-mail had received this e-mail from yet another sender, and specify the virus intrusion route based on the operation history.

Furthermore, the virus intrusion route searching units 202 and 222 may determine the path name of the file operated by the process based on the process identification information of the process in which a virus was detected, determine an operation history indicating that the file was stored in a removable device based on the path name of the file, determine identification information of the removable device based on the operation history, determine another terminal device that was connected to the removable device based on the identification information of the removable device, and determine the virus intrusion route based on the operation history of the other terminal device.

Furthermore, if the detected virus has already been uploaded on a website, the virus intrusion route searching units 202 and 222 may specify the URL of the website based on the uploaded process with reference to the virus, and determine the virus intrusion route and the distributed route.

Furthermore, if the detected virus has been transmitted with an attached e-mail, the virus intrusion route searching units 202 and 222 may determine e-mail information of the e-mail, such as the Message ID, From, and To, based on the attaching process with reference to the virus, and determine the virus distribution route or virus intrusion route.

Furthermore, a virus that was detected in the terminal devices that include the virus intrusion route searching units 202 and 222 may be a file that was created in and by another terminal device via file sharing. In this case, it may be impossible to determine by which terminal device the virus was created only based on the operation history of the terminal device. In this case, the virus intrusion route searching units 202 and 222 may acquire the operation history of another terminal device that is associated with or participates in file sharing, and determine a virus intrusion route based on the operation history thereof.

Furthermore, if the process in which the detected virus was created refers to a ZIP file, the virus intrusion route searching units 202 and 222 may determine a virus intrusion route by associating a file created by decompressing the ZIP file with a virus detected by the virus intrusion route searching units 202 and 222.

Note that if the process that is involved in the detected virus referenced a plurality of ZIP files, the virus intrusion route searching units 202 and 222 may be configured to perform narrowing-down to one file that is related to the virus intrusion route by executing weighting with respect to the plurality of ZIP files.

Note that as an example of weighting, a method in which a larger weighting is given to the ZIP file that was referenced immediately before the virus file was newly created, or another weighting (for example, the time and date at which the file was operated, the execution result of this file, the result of virus detection executed with respect to the file, information input by a user, and the like) may be executed. Accordingly, narrowing-down to one file that is related to the virus intrusion route is performed. Accordingly, the largest weighting will be given to the ZIP file that was referenced at a time closest to the time at which a virus file was newly created.

Furthermore, similarly to the case where a target virus file is ZIP-compressed, the virus intrusion route searching units 202 and 222 may determine the ZIP file including the virus file and determine a virus route.

Furthermore, based on the process identification information of a process in which a virus was detected, the virus intrusion route searching units 202 and 222 may determine a file operated between activation of the process and detection of the virus, and the virus intrusion route searching units 202 and 222 may be configured, if a plurality of files are determined, to perform narrowing-down to one file that is related to the virus intrusion route by executing weighting with respect to the plurality of files.

Note that weighting may be executed according to at least one of the time and date at which the file was operated, the execution result of this file, the result obtained by executing virus detection on this file, and information input by a user.

If one or more results (intrusion routes) are determined by the virus intrusion route searching units 202 and 222, the virus intrusion route searching units 202 and 222 may set weighting for the results, taking into consideration the results alone, or combinations thereof.

Furthermore, when anti-virus software (virus detecting unit 203) has detected a virus, irrespective to whether or not the result is automatically notified to the virus intrusion route searching unit 202, it is also possible to manually notify a client device in which a virus was detected, or the virus intrusion route searching unit 222 that is present on a server that manages this client device of the virus information, and perform backtracking at an arbitrary timing.

The above-described various types of unit may be realized by a computer executing programs. Furthermore, operations of the client device and the server device may be limited based on backtrack results. For example, if it is apparent from the backtrack result that a virus was downloaded during browsing a specific website, the agent service 201 or the managing unit 225 prohibits the access to the website, and restricts or prohibits the operation of this virus. Accordingly, attack of the virus can be prevented.

Furthermore, the agent service 201 or the managing unit 225 may separate or delete the file that was determined as a virus.

Furthermore, the virus detecting unit 203 may transmit the file that was determined as a virus to the managing unit 225, and the managing unit 225 or a server provided outside the managing unit 225 collects such files.

The present invention is not limited to the above-described embodiments, and various variation and modification are possible without departing from the spirit and scope of the present invention. Therefore, the following Claims are attached in order to make the scope of the present invention public.

What is claimed is:

1. A virus intrusion route determining device for backtracking an intrusion route of a virus to a terminal device, the virus intrusion route determining device comprising:
   an operation history memory configured to store an operation history, which is a history of operations executed in the terminal device, including (a) at least one process ID (identification), which is information identifying a software process, and (b) operation content; and
   a processor configured to:
   (a) determine, upon detecting a virus, an intrusion route of the detected virus by backtracking the intrusion route based on the operation history stored in the operation history memory; and
   (b) output information indicating the intrusion route determined by the processor, the output information including information indicating a route in which the virus moved,
   wherein the processor is configured to determine the intrusion route by searching the operation history that is a history of operations executed in the terminal device based on the operation content that is related to the virus and by using a process ID that is related to the virus as a search key.

2. The virus intrusion route determining device according to claim 1, wherein the virus intrusion route determining device is provided in the terminal device.

3. The virus intrusion route determining device according to claim 1, wherein the virus intrusion route determining device is provided in a server device that is connected to the terminal device.

4. The virus intrusion route determining device according to claim 3, wherein the processor is further configured to:
   (a) detect a virus; and
   (b) transmit, to the server device, a request for determining an intrusion route of the detected virus.

5. The virus intrusion route determining device according to claim 3, wherein the terminal device includes:
   a processor configured to transfer an operation history stored in the operation history memory of the terminal device so that the operation history is stored in the server device, and deleting all or part of the transferred operation history.

6. The virus intrusion route determining device according to claim 1, wherein the processor is further configured to determine an intrusion entry via which a virus is intruded into the terminal device by determining, for each of records constituting the operation history, whether or not an operation content included therein is a specific operation content that is executed at the time of virus intrusion.

7. The virus intrusion route determining device according to claim 1, wherein the processor is further configured to determine the intrusion route by additionally searching the operation history for a parent process that called a child process involved in saving of the virus.

8. The virus intrusion route determining device according to claim 3, wherein the operation history stored in the operation history memory of the virus intrusion route determining device provided in the server device covers a longer period of time than an operation history stored in an operation history memory of a virus intrusion route determining device provided in the terminal device.

9. The virus intrusion route determining device according to claim 3, wherein operation histories acquired by a plurality of terminal devices are stored in the operation history memory provided in the server device, and
   wherein the processor is further configured to search, when a virus has been found in one of the plurality of terminal devices, the operation histories of the plurality of terminal devices based on a path name or process identification information that is related to the virus, and to determine the intrusion route.

10. The virus intrusion route determining device according to claim 1, wherein the processor is further configured to search in the operation history memory, based on process identification information of a process in which the virus was detected, for a path name of a file operated between activation of the process and detection of the virus, and to determine a terminal device that provided the file, based on the path name found by the search.

11. The virus intrusion route determining device according to claim 1, wherein the processor is further configured to search the operation history memory, based on process identification information of a process in which the virus was detected, for a path name of a file operated between activation of the process and detection of the virus, and to recognize the process itself as a virus when a file operated between activation of the process and detection of the virus is not found.

12. The virus intrusion route determining device according to claim 3, wherein the processor is further configured to:
   (a) determine, based on process identification information of a process in which a virus was detected, another process in which an executable file of that process, in which the virus was detected, was created;

(b) determine whether or not the other process is an e-mail mail user agent (MUA); and
(c) determine, if the other process is an e-mail MUA,
(1) an operation history indicating that the e-mail MUA received an e-mail to which the executable file of the process is attached,
(2) a sender of the e-mail based on the operation history,
(3) an operation history indicating that the sender transferred the e-mail,
(4) an operation history indicating that the e-mail transferred by the sender was received by yet another sender, and
(5) the intrusion route based on the operation histories.

13. The virus intrusion route determining device according to claim 3, wherein the processor is further configured to:
determine, based on process identification information of a process in which a virus was detected, a path name of a file operated by the process;
determine, based on the path name of the file, an operation history indicating that the file was stored in a removable device; determine identification information of the removable device based on the operation history;
determine another terminal device that has ever connected to the removable device, based on the identification information of the removable device, and
determine the intrusion route based on the operation history of the other terminal device.

14. The virus intrusion route determining device according to claim 1, wherein the processor is further configured to determine, based on process identification information of a process in which a virus was detected, a file operated between activation of the process and detection of the virus operation,
wherein, when a plurality of files are determined, the processor performs narrowing-down of the plurality of files to one file that is related to the intrusion route by executing weighting with respect to the plurality of files, and
wherein the weighting is executed according to at least one of (1) the time and date at which the one file, of the plurality of files, was operated, (2) the execution result of the one file, (3) the result obtained by executing virus detection on the one file, and (4) information input by a user.

15. The virus intrusion route determining device according to claim 1, wherein the processor is further configured to determine a route in which the virus was distributed based on the operation history stored in the operation history memory.

16. A method for backtracking a virus intrusion route of a virus to a terminal device, the method comprising:
an operation history storing process of storing an operation history, which is a history of operations executed in the terminal device, including (a) at least one process ID (identification), which is information identifying a software process, and (b) operation content, into an operation history memory;
a determining process of determining, upon detecting a virus, an intrusion route of the detected virus by backtracking the intrusion route based on the operation history stored in the operation history storage unit; and
an outputting process of outputting information indicating the intrusion route determined in the determining process, the output information including information indicating a route in which the virus moved,
wherein the determining process includes (1) searching the operation history that is a history of operations executed in the terminal device based on the operation content that is related to the virus and by using a process ID that is related to the virus as a search key, and (2) determining the intrusion route based on the searching.

17. A program stored in a non-transitory computer-readable recording medium that causes a computer to execute virus intrusion route determining processing for backtracking an intrusion route of a virus to a terminal device, wherein the computer has an operation history memory configured to store an operation history, which is a history of operations executed in the terminal device, including (a) at least one process ID (identification), which is information identifying a software process, and (b) operation content, and wherein the program causes the computer to function as:
(a) a determining unit configured to determine, upon detecting a virus, an intrusion route of the detected virus by backtracking the intrusion route based on the operation history stored in the operation history memory; and
(b) an output unit configured to output information indicating the intrusion route determined by the determining unit, the output information including information indicating a route in which the virus moved, and
wherein the determination by the determining unit comprises (1) searching the operation history that is a history of operations executed in the terminal device based on the operation content that is related to the virus and by using a process ID that is related to the virus as a search key, and (2) determining the intrusion route based on the search.

18. The virus intrusion route determining device according to claim 1, wherein the processor is further configured to, when a virus has been found in the terminal device, search the operation history stored in the operation history memory, based on a time and date related to the virus, for a file name, a path name, or process identification information that is related to the virus, and to determine the virus intrusion route.

19. A virus intrusion route determining device for backtracking an intrusion route of a virus to a terminal device, the virus intrusion route determining device comprising:
an operation history memory configured to store an operation history, which is a history of operations executed in the terminal device, including (a) at least one process ID (identification), which is information identifying a software process, and (b) operation content; and
a processor configured to:
(a) attempt to determine, upon detecting a virus, an intrusion route of the virus by backtracking the intrusion route based on the operation history stored in the operation history memory; and
(b) transmit, to a server device connected to the terminal device, a request for determining an intrusion route based on the operation history stored in the server device, when the processor cannot determine the intrusion route based on the operation history stored in the operation history memory,
wherein the terminal device is provided with the virus intrusion route determining device and the server device is also provided with the virus intrusion route determining device, and the virus intrusion route determining device provided in the terminal device and the virus intrusion route determining device provided in the server device cooperate with each other to determine the intrusion route to the terminal device, and wherein the determination of the intrusion route to the terminal device comprises (1) searching the operation history that is a history of operations executed in the terminal device based on the operation content that is related to the virus and by using a process ID that is related to the virus as a search key, and (2) determining the intrusion route based on the search.

20. A virus intrusion route determining device for backtracking an intrusion route of a virus to a terminal device, the virus intrusion route determining device comprising:

an operation history memory configured to store an operation history, which is a history of operations executed in the terminal device; and a processor configured to attempt to determine, upon detecting a virus, an intrusion route of the virus, the attempted determination comprising conducting an examination of the operation history stored in the operation history storage unit that is a history of operations executed in the terminal device, wherein the terminal device is provided with the virus intrusion route determining device that stores, in the terminal device, a first operation history, and a server device connected to the terminal device is also provided with the virus intrusion route determining device that stores, in the server device, a second operation history, wherein before the processor provided in the terminal device determines the intrusion route, the processor provided in the terminal device transmits, to a server device, a request for determining the intrusion route, wherein the processor provided in the server device determines the intrusion route with respect to the second operation history, wherein the processor provided in the terminal device conducted an examination of the first operation history during a first time period, wherein the second operation history was acquired during a second time period, and wherein the second time period is later in time than the first time period.

21. A virus intrusion route determining device for backtracking an intrusion route of a virus to a terminal device, the virus intrusion route determining device comprising:

an operation history memory configured to store an operation history, which is a history of operations executed in the terminal device, including at least one process ID (identification), which is information identifying a software process; and a processor configured to, upon detecting a virus, determine an intrusion route of the virus by backtracking the intrusion route based on the operation history stored in the operation history memory that is a history of operations executed in the terminal device, wherein the processor is further configured to determine, based on a process ID of a process in which the virus was detected, one or more files operated between activation of the process and detection of the virus, wherein when a plurality of files are determined, the processor performs narrowing-down of the plurality of files to one file that is related to the intrusion route after executing weighting with respect to the plurality of files.

22. A method for backtracking an intrusion route of a virus to a terminal device, the method comprising:

storing, by the terminal device, an operation history, which is a history of operations executed in the terminal device, into an operation history memory, including (a) at least one process ID (identification), which is information identifying a software process, and (b) operation content;

attempting to determine, by the terminal device, upon detecting a virus, an intrusion route of the detected virus by backtracking the intrusion route based on the operation history stored in the operation history memory that is a history of operations executed in the terminal device; and transmitting, to a server device connected to the terminal device, a request for determining an intrusion route based on an operation history stored in the server device, when the intrusion route cannot be determined based on the operation history stored in the operation history memory, wherein the terminal device is provided with the virus intrusion route determining device and the server device is also provided with the virus intrusion route determining device, and the virus intrusion route determining device provided in the terminal device and the virus intrusion route determining device provided in the server device cooperate with each other to determine the intrusion route, wherein the request for determining a virus intrusion route includes a request (1) to search the operation history stored in the server device based on the operation content that is related to the virus and by using a process ID that is related to the virus as a search key, and (2) to determine the intrusion route based the search.

23. A program stored in a non-transitory computer-readable recording medium that causes a computer to function as a virus intrusion route determining device that backtracks an intrusion route of a virus to a terminal device, wherein the computer includes an operation history memory configured to store an operation history, which is a history of operations executed in the terminal device, including (a) at least one process ID (identification), which is information identifying a software process, and (b) operation content, the program causing the computer to function as:

a determining unit configured to attempt to determine, upon detecting a virus, an intrusion route of the detected virus by backtracking the intrusion route based on the operation history stored in the operation history memory that is a history of operations executed in the terminal device; and a request transmitting unit configured to transmit, to a server device connected to the terminal device, a request for determining an intrusion route based on an operation history stored in the server device, when the determining unit cannot determine the intrusion route based on the operation history stored in the operation history memory, wherein the terminal device is provided with the virus intrusion route determining device and the server device is also provided with the virus intrusion route determining device, and the virus intrusion route determining device provided in the terminal device and the virus intrusion route determining device provided in the server device cooperate with each other to determine the intrusion route, wherein the request for determining a virus intrusion route includes a request (1) to search the operation history stored in the server device based on the operation content that is related to the virus and by using a process ID that is related to the virus as a search key, and (2) to determine the intrusion route based on the search.

24. A method that is executed in a virus intrusion route determining device that backtracks an intrusion route of a virus to a terminal device, wherein the terminal device has a virus intrusion route determining device that stores, in the terminal device, a first operation history, and a server device connected to the terminal device also has a virus intrusion route determining device that stores, in the server device, a second operation history, the method comprising:
   storing an operation history, which is a history of operations executed in the terminal device, into an operation history memory; and
   determining, upon detecting a virus, an intrusion route of the detected virus, based on the operation history stored in the operation history memory that is a history of operations executed in the terminal device,
   wherein the terminal device transmits, to the server device, before determining the intrusion route, a request for determining the intrusion route,
   wherein the virus intrusion route determining device provided in the server device determines the intrusion route with respect to the second operation history,
   wherein the virus intrusion route determining device provided in the terminal device conducted an examination of the first operation history during a first time period,
   wherein the second operation history was acquired during a second time period, and
   wherein the second time period is later in time than the first time period.

25. A program stored in a non-transitory computer-readable recording medium that causes a computer to function as a virus intrusion route determining device that backtracks an intrusion route of a virus to a terminal device, the computer having an operation history memory configured to store an operation history, which is a history of operations executed in the terminal device, the program causing the computer to function as:
   a determining unit configured to attempt to determine, upon detecting a virus, an intrusion route of the detected virus, the attempted determination comprising conducting an examination of the operation history stored in the operation history memory that is a history of operations executed in the terminal device,
   wherein the terminal device is provided with the virus intrusion route determining device that stores, in the terminal device, a first operation history, and a server device connected to the terminal device is also provided with the virus intrusion route determining device that stores, in the server device, a second operation history,
   wherein before the determining unit provided in the terminal device determines the intrusion route, the determining unit provided in the terminal device transmits, to the server device, a request for determining the intrusion route,
   wherein the determining unit provided in the server device determines the intrusion route based on the second operation history,
   wherein the determining unit provided in the terminal device conducted an examination of the first operation history during a first time period,
   wherein the second operation history was acquired during a second time period, and
   wherein the second time period is later in time than the first time period.

26. A method in a virus intrusion route determining device for backtracking an intrusion route of a virus to a terminal device, the method comprising:
   a storing process of storing an operation history, which is a history of operations executed in the terminal device, into an operation history storage unit; and
   a determining process of, upon detecting a virus, determining an intrusion route of the detected virus by backtracking the intrusion route based on the operation history stored in the operation history storage unit that is a history of operations executed in the terminal device,
   wherein the determining process includes the processes of:
   (a) determining, based on process identification information of a process in which the virus was detected, one or more files operated between activation of the process and detection of the virus; and
   (b) performing, when a plurality of files are determined, narrowing-down of the plurality of files to one file that is related to the intrusion route after executing weighting with respect to the plurality of files.

27. A program stored in a non-transitory computer-readable recording medium that causes a computer to function as a virus intrusion route determining device for backtracking an intrusion route of a virus to a terminal device, wherein the program causes the computer to function as:
   an operation history storage unit configured to store an operation history, which is a history of operations executed in the terminal device; and
   a determining unit for, upon detecting a virus, determining an intrusion route of the detected virus by backtracking the intrusion route based on the operation history stored in the operation history storage unit that is a history of operations executed in the terminal device,
   wherein the determining unit is further configured to determine, based on process identification information of a process in which the virus was detected, one or more files operated between activation of the process and detection of the virus, and
   wherein, when a plurality of files are determined, the determining unit performs narrowing-down of the plurality of files to one file that is related to the virus intrusion route after executing weighting with respect to the plurality of files.

* * * * *